(12) United States Patent
Gyoda

(10) Patent No.: US 10,120,172 B2
(45) Date of Patent: Nov. 6, 2018

(54) OPTICAL SYSTEM AND IMAGE PICKUP APPARATUS INCLUDING THE SAME

(71) Applicant: CANON KABUSHIKI KAISHA, Tokyo (JP)

(72) Inventor: Yuichi Gyoda, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/595,231

(22) Filed: May 15, 2017

(65) Prior Publication Data
US 2017/0336608 A1 Nov. 23, 2017

(30) Foreign Application Priority Data
May 19, 2016 (JP) ................. 2016-100252

(51) Int. Cl.
| | |
|---|---|
| *G02B 15/28* | (2006.01) |
| *G02B 7/09* | (2006.01) |
| *G02B 15/173* | (2006.01) |
| *G02B 27/00* | (2006.01) |
| *G02B 9/62* | (2006.01) |
| *G02B 27/64* | (2006.01) |

(52) U.S. Cl.
CPC .......... *G02B 15/28* (2013.01); *G02B 7/09* (2013.01); *G02B 9/62* (2013.01); *G02B 15/173* (2013.01); *G02B 27/0025* (2013.01); *G02B 27/646* (2013.01)

(58) Field of Classification Search
CPC ........ G02B 7/09; G02B 15/28; G02B 15/173; G02B 27/0025

USPC ......................................... 396/79
See application file for complete search history.

(56) References Cited

U.S. PATENT DOCUMENTS

| | | | | |
|---|---|---|---|---|
| 5,040,881 A | * | 8/1991 | Tsuji | G02B 15/167 359/557 |
| 6,493,142 B1 | * | 12/2002 | Itoh | G02B 15/161 359/407 |
| 9,116,286 B2 | * | 8/2015 | Hayashi | G02B 7/08 |
| 9,406,510 B2 | | 8/2016 | Tsujita et al. | |
| 2013/0162884 A1 | | 6/2013 | Tashiro et al. | |

(Continued)

FOREIGN PATENT DOCUMENTS

| | | |
|---|---|---|
| JP | 2012-242472 A | 12/2012 |
| JP | 2013-88718 A | 5/2013 |

*Primary Examiner* — Clayton E Laballe
*Assistant Examiner* — Linda B Smith
(74) *Attorney, Agent, or Firm* — Carter, DeLuca, Farrell & Schmidt, LLP

(57) ABSTRACT

Provided is an optical system, comprising, in order from an object side: a positive first unit; a negative second unit; and a positive third unit, in which, during focusing from infinity to a close distance, the second unit moves toward the image side, and an interval between adjacent units is changed, in which the first unit consists of, in order from the object side: a negative first sub-unit, which does not move for image stabilization; a positive second sub-unit, which moves during the image stabilization; and a third sub-unit, which does not moves for the image stabilization, and in which a distance from a lens surface closest to the object side in the first unit to an image plane when focusing at infinity, and a distance from a lens surface closest to the object side in the second sub-unit to the image plane when focusing at infinity are appropriately set.

15 Claims, 21 Drawing Sheets

(56) References Cited

U.S. PATENT DOCUMENTS

2016/0116734 A1 4/2016 Gyoda
2017/0254991 A1 9/2017 Gyoda

* cited by examiner

OPTICAL SYSTEM AND IMAGE PICKUP APPARATUS INCLUDING THE SAME

BACKGROUND OF THE INVENTION

Field of the Invention

The present invention relates to an optical system and an image pickup apparatus including the optical system, which are suitable for an image pickup optical system to be used in an image pickup apparatus such as, in particular, a still camera, a video camera, a digital still camera, or a monitoring camera.

Description of the Related Art

In recent years, an image pickup apparatus is downsized as a whole. In addition, an image pickup optical system used therein is required to have a short total lens length and a small size as a whole. Further, the image pickup optical system is required to be capable of executing high-speed autofocus adjustment.

In general, as focusing methods, there have been known a method in which the entire image pickup optical system is moved, and a method in which a lens system forming a part of the image pickup optical system is moved. Of those methods, there has been known a so-called inner focusing method, in which an intermediate lens unit of the image pickup optical system is used for focusing. As compared to the focusing method in which the entire image pickup optical system is moved, the inner focusing method has features that a movement amount of a focusing lens unit may be reduced, and that the focusing lens unit is easy to reduce the size and weight.

In Patent Application Laid-Open No. 2012-242472, there is disclosed an image pickup optical system of an inner focusing method, consisting of, in order from an object side to an image side, first to third lens units having positive, negative, and positive refractive powers, in which the second lens unit is moved during focusing. Meanwhile, in a macro lens having a high image pickup magnification, a depth of field is reduced. Therefore, an image is generally taken by reducing an aperture diameter of an aperture stop to increase an effective F-number.

Therefore, with the macro lens, there is a need to reduce a shutter speed. Therefore, when hand shaking or the like occurs during the image taking, an image blur occurs, and image quality is deteriorated. In the related art, for the purpose of preventing the deterioration of the image caused by the hand shaking or the like, there has been known an image pickup optical system having an image stabilizing function of correcting an image blur by decentering an image stabilizing lens unit, which is a lens unit forming a part of the optical system, in a direction perpendicular to an optical axis during exposure.

In Patent Application Laid-Open No. 2013-88718, there is disclosed an imaging lens consisting of a front lens group, an aperture stop, and a rear lens group. In the imaging lens, a lens unit having a positive refractive power, which forms a part of the front lens group, is used for image stabilization, and a lens unit having a positive refractive power or a lens unit having a negative refractive power, which forms a part of the rear lens group, is used for focusing.

As compared to the focusing method in which the entire optical system is moved, with the inner focusing method, an aberration variation caused by moving a focus lens unit is increased, and it becomes difficult to satisfactorily correct aberrations over the entire object distance.

Meanwhile, with the method in which a lens unit forming a part of the optical system is moved as the image stabilizing lens unit so as to have a component in the direction perpendicular to the optical axis during the image stabilization, large decentering aberration occurs during the image stabilization, and it becomes difficult to maintain high optical performance.

With the above-mentioned image pickup optical system having the three-unit structure using the inner focusing method, in order to reduce an aberration variation during focusing, and to maintain the high optical performance during the image stabilization, it is important to appropriately set lens configurations of the respective lens units, refractive powers of the respective lens units, and the like. For example, it is important to appropriately set the lens configuration of the first lens unit, the refractive powers of the second lens unit and the third lens unit, and the like.

SUMMARY OF THE INVENTION

It is an object of the present invention to provide an optical system, which is easy to perform quick focusing, has high optical performance over the entire object distance, and is easy to maintain the high optical performance even during image stabilization, and an image pickup apparatus including the optical system.

According to one embodiment of the present invention, there is provided an optical system, comprising, in order from an object side to an image side: a first lens unit having a positive refractive power; a second lens unit having a negative refractive power; and a third lens unit having a positive refractive power, in which, during focusing from infinity to a close distance, the second lens unit moves toward the image side, and an interval between each pair of adjacent lens units is changed, in which the first lens unit consists of, in order from the object side to the image side: a first lens sub-unit having a negative refractive power, which does not move for image stabilization; a second lens sub-unit having a positive refractive power, which moves during the image stabilization; and a third lens sub-unit, which does not move for the image stabilization, in which the second lens sub-unit includes a meniscus positive lens LIS having a concave surface facing the object side, and in which the following conditional expression is satisfied: $0.78<DB/DL<0.95$, where DL represents a distance from a lens surface closest to the object side in the first lens unit to an image plane when focusing at infinity, and DB represents a distance from a lens surface closest to the object side in the second lens sub-unit to the image plane when focusing at infinity.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Now, an optical system according to the present invention and an image pickup apparatus including the optical system are described. The optical system of the present invention includes, in order from an object side to an image side, a first lens unit having a positive refractive power, a second lens unit having a negative refractive power, and a third lens unit having a positive refractive power. During focusing from infinity to a close distance, the second lens unit is configured to move toward the image side, and an interval between each pair of adjacent lens units is changed. The term "lens unit" as used herein is a lens element configured to move integrally during focusing, which may include one or more lenses, and may not include a plurality of lenses.

Figure 1A:
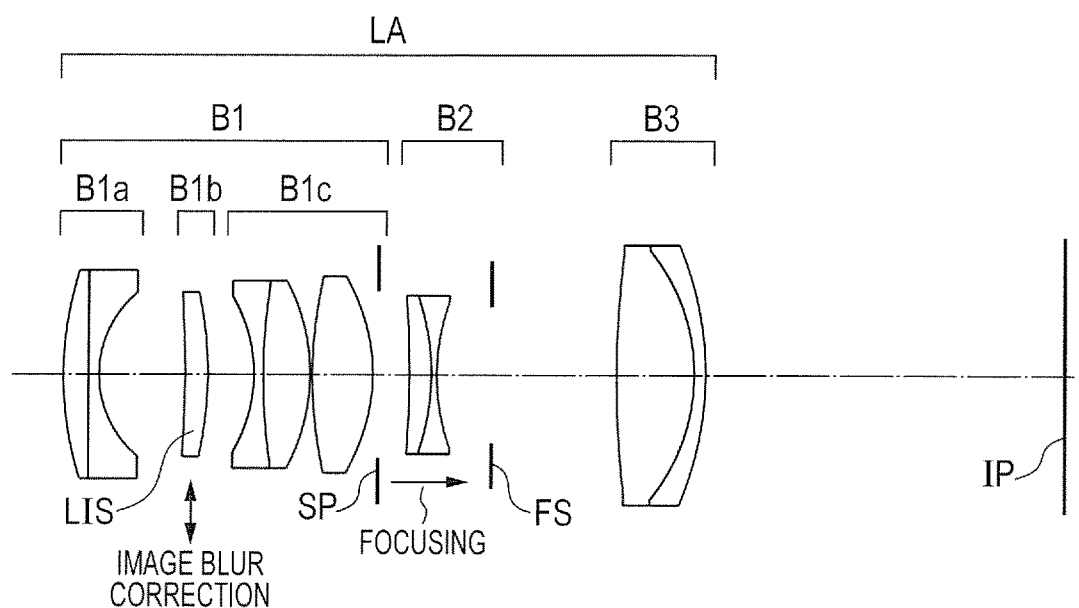
FIG. 1A is a lens cross-sectional view of an optical system according to Embodiment 1 of the present invention when focusing at infinity.
Figure 1B:
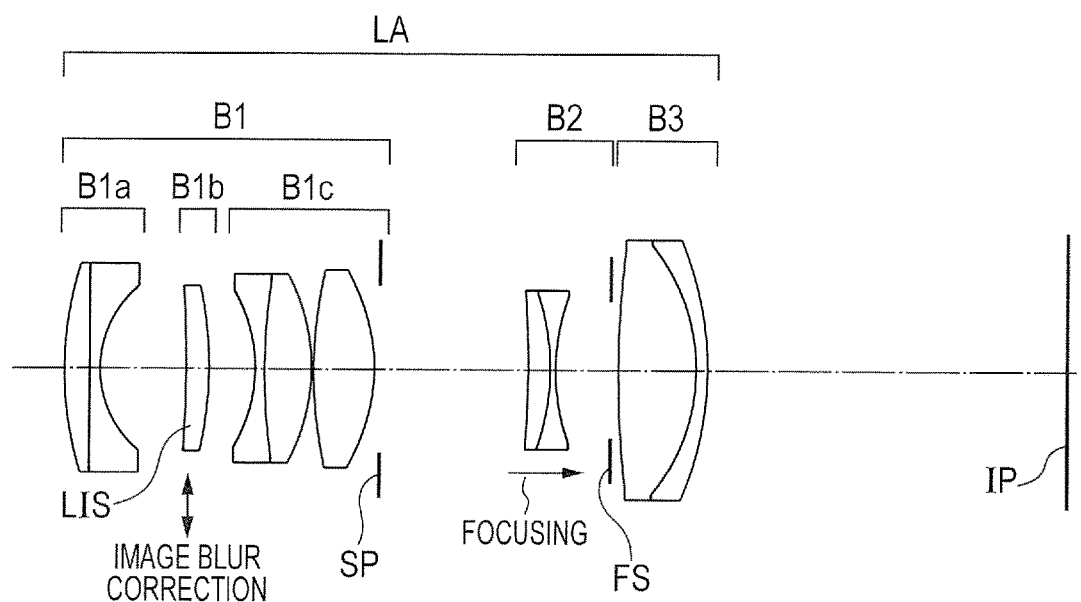
FIG. 1B is a lens cross-sectional view of the optical system according to Embodiment 1 when focusing at a close distance.
Figure 2A:
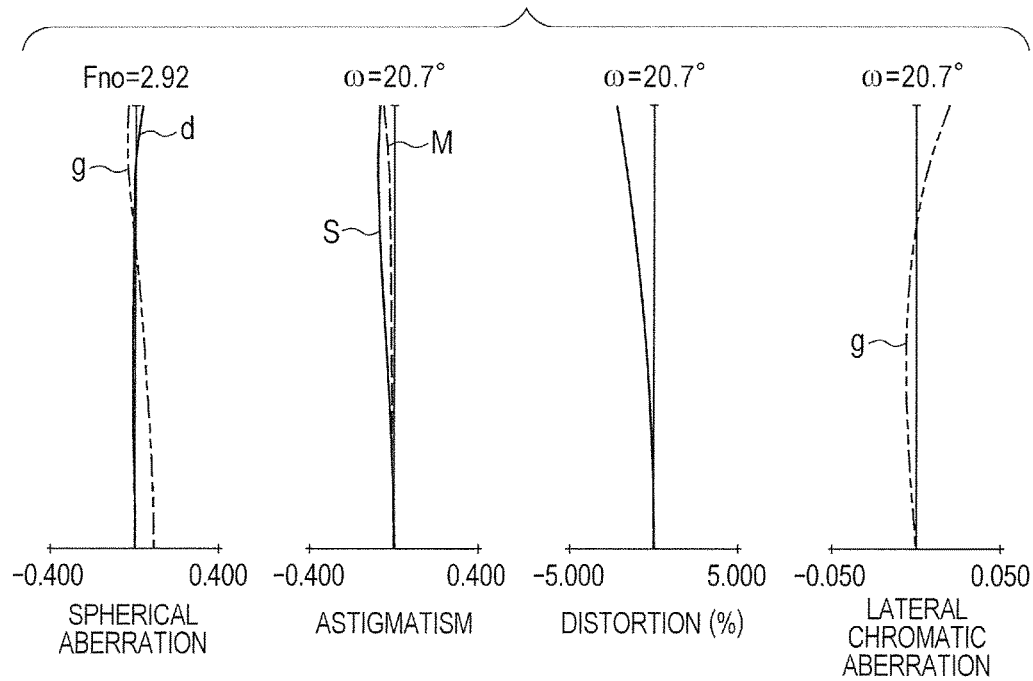
FIG. 2A is a longitudinal aberration diagram of the optical system according to Embodiment 1 when focusing at infinity.
Figure 2B:
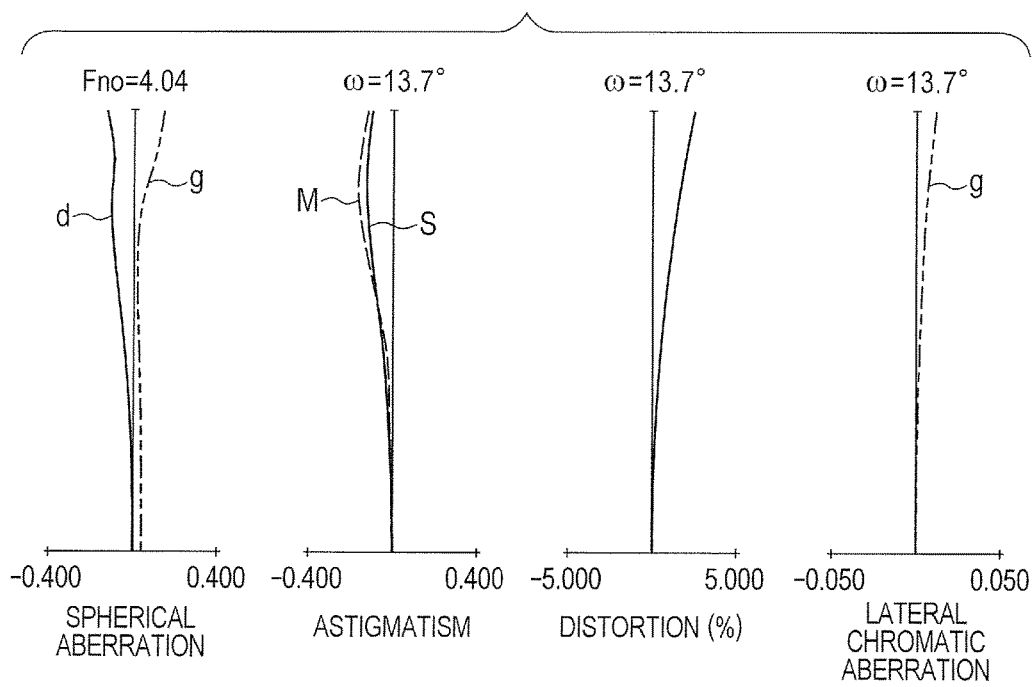
FIG. 2B is a longitudinal aberration diagram of the optical system according to Embodiment 1 when focusing at the close distance.
Figure 3A:
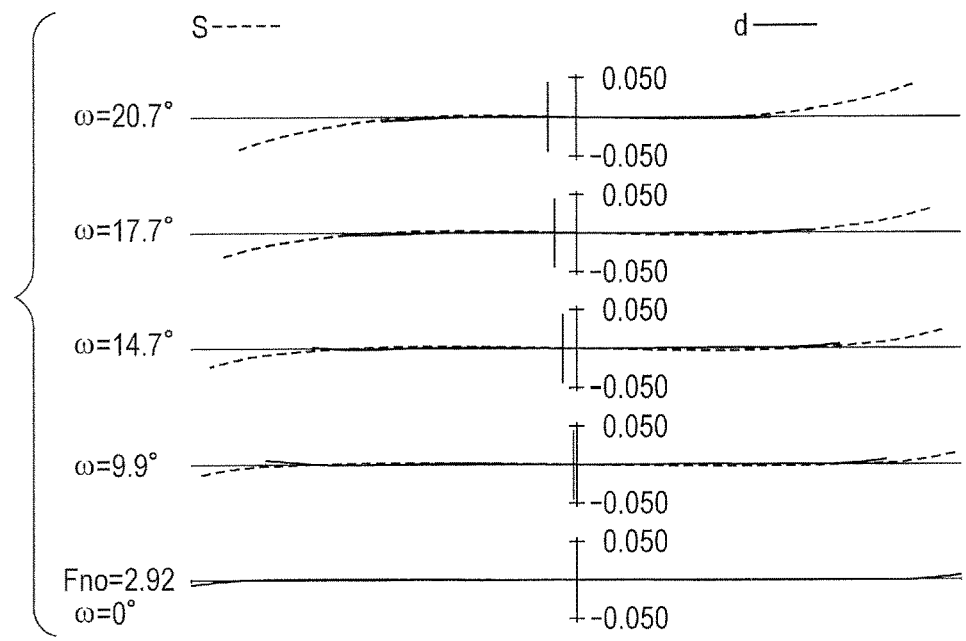
FIG. 3A is a lateral aberration diagram of the optical system according to Embodiment 1 when focusing at infinity.
Figure 3B:
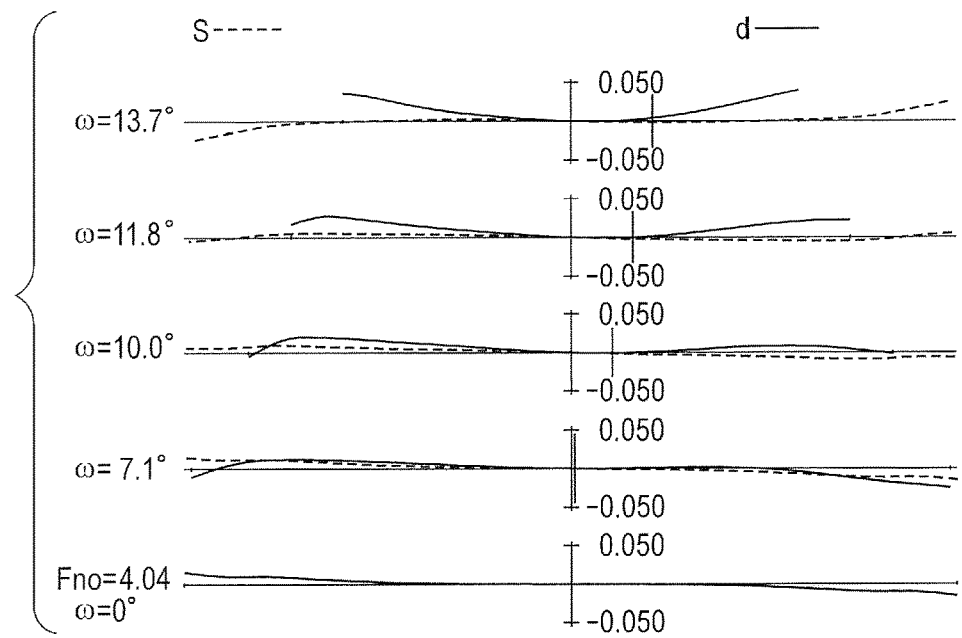
FIG. 3B is a lateral aberration diagram of the optical system according to Embodiment 1 when focusing at the close distance.

FIG. 1A and FIG. 1B are lens cross-sectional views of an optical system according to Embodiment 1 of the present invention when focusing at infinity and when focusing at a close distance, respectively. FIG. 2A and FIG. 2B are longitudinal aberration diagrams of the optical system according to Embodiment 1 when focusing at infinity and when focusing at the close distance, respectively, and when not performing image stabilization. FIG. 3A and FIG. 3B are lateral aberration diagrams of the optical system according to Embodiment 1 when focusing at infinity and when focusing at the close distance, respectively, and when not performing the image stabilization.

Figure 4A:
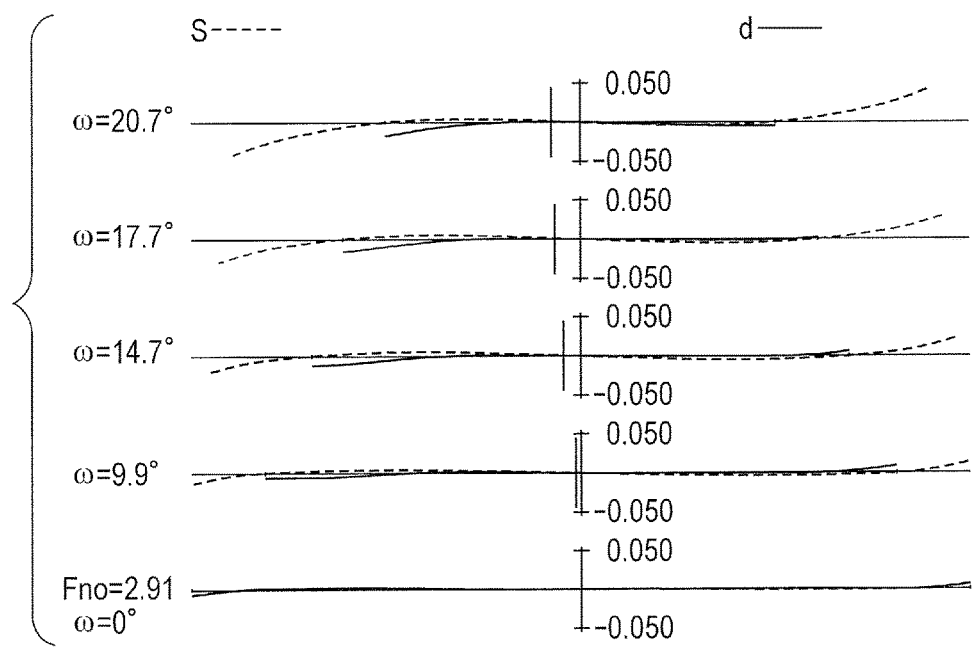
FIG. 4A is a lateral aberration diagram of the optical system according to Embodiment 1 when focusing at infinity and when performing image stabilization.
Figure 4B:
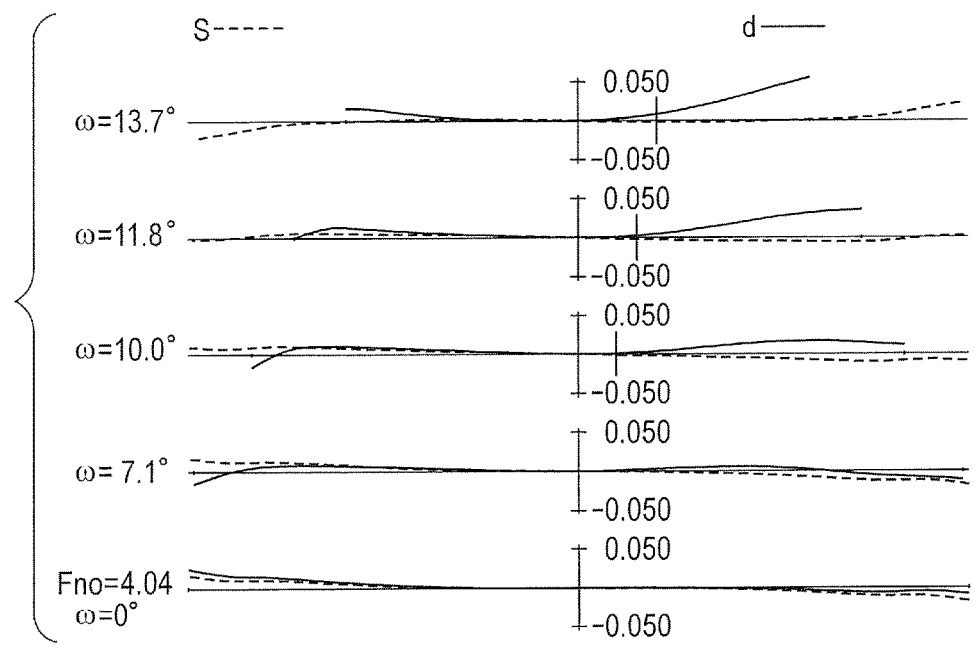
FIG. 4B is a lateral aberration diagram of the optical system according to Embodiment 1 when focusing at the close distance and when performing the image stabilization.

FIG. 4A and FIG. 4B are lateral aberration diagrams of the optical system according to Embodiment 1 when focusing at infinity and when focusing at the close distance, respectively, and when decentering an image stabilizing lens unit (that is, performing image stabilization) so that a change in image forming position is corrected when an angle of an incident ray at the center of an image plane is changed by 0.4°. Embodiment 1 relates to an optical system having an angle of view of 41.46° and an F-number of 2.92. The term "close distance" as used herein refers to an image pickup magnification of −1.00. The same applies hereinafter.

Figure 5A:
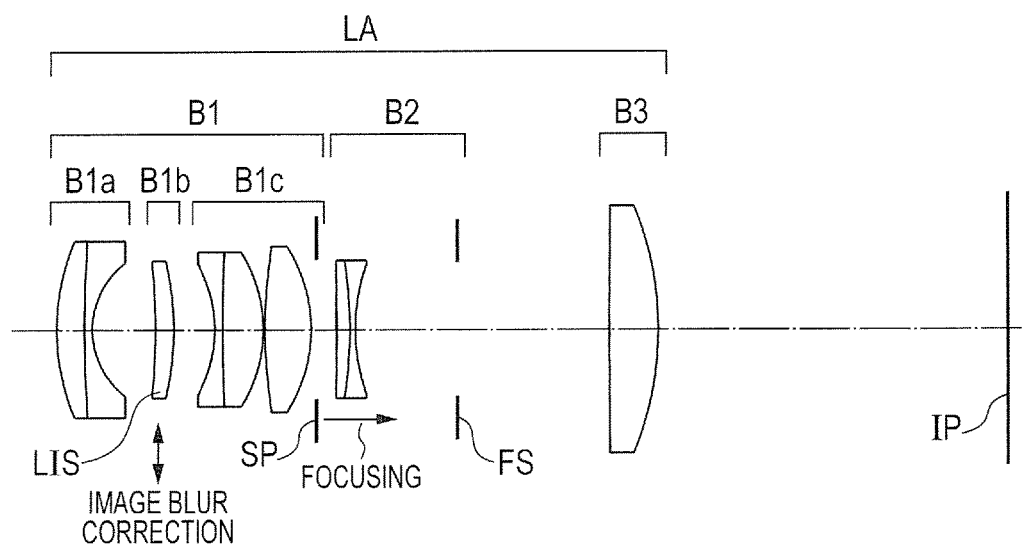
FIG. 5A is a lens cross-sectional view of an optical system according to Embodiment 2 of the present invention when focusing at infinity.
Figure 5B:
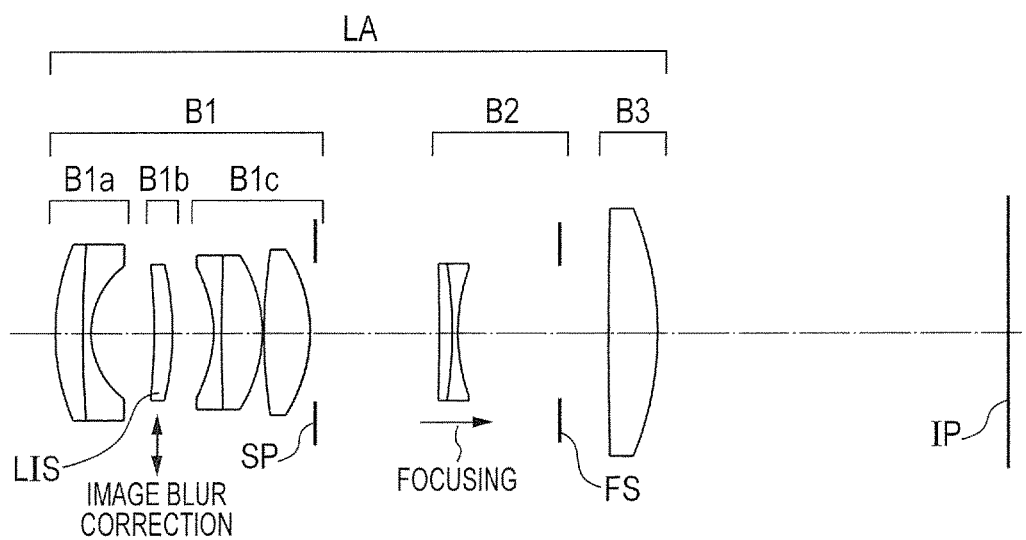
FIG. 5B is a lens cross-sectional view of the optical system according to Embodiment 2 when focusing at a close distance.
Figure 6A:
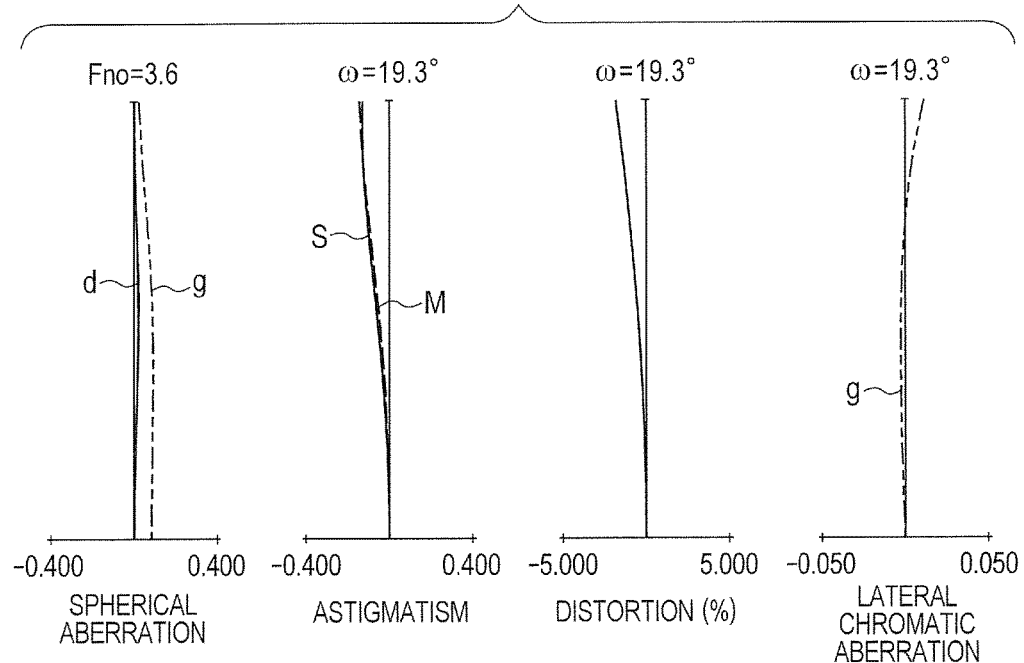
FIG. 6A is a longitudinal aberration diagram of the optical system according to Embodiment 2 when focusing at infinity.
Figure 6B:
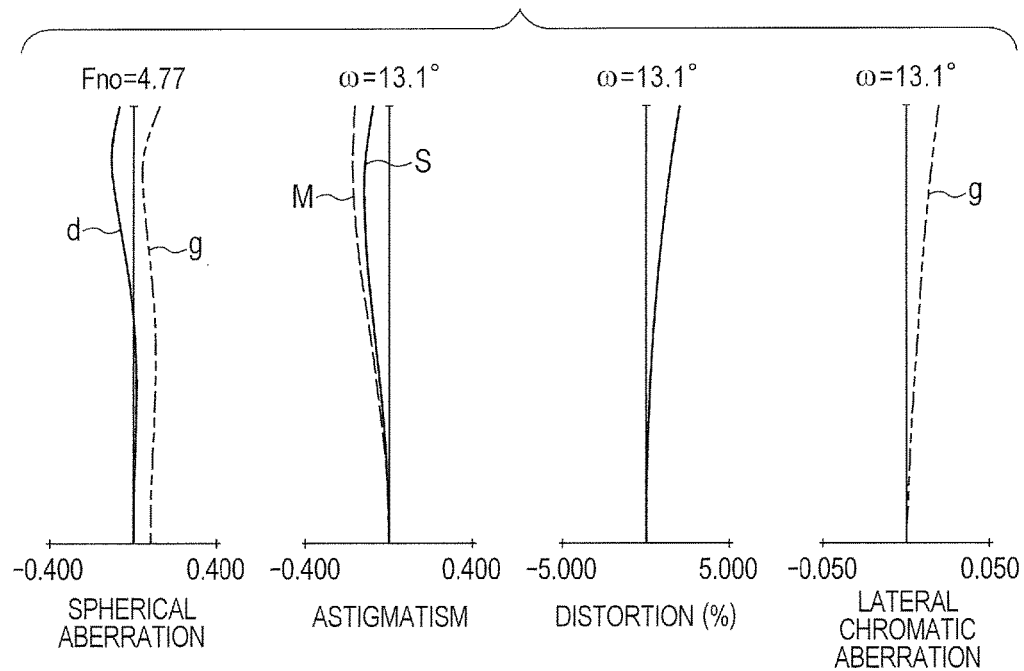
FIG. 6B is a longitudinal aberration diagram of the optical system according to Embodiment 2 when focusing at the close distance.
Figure 7A:
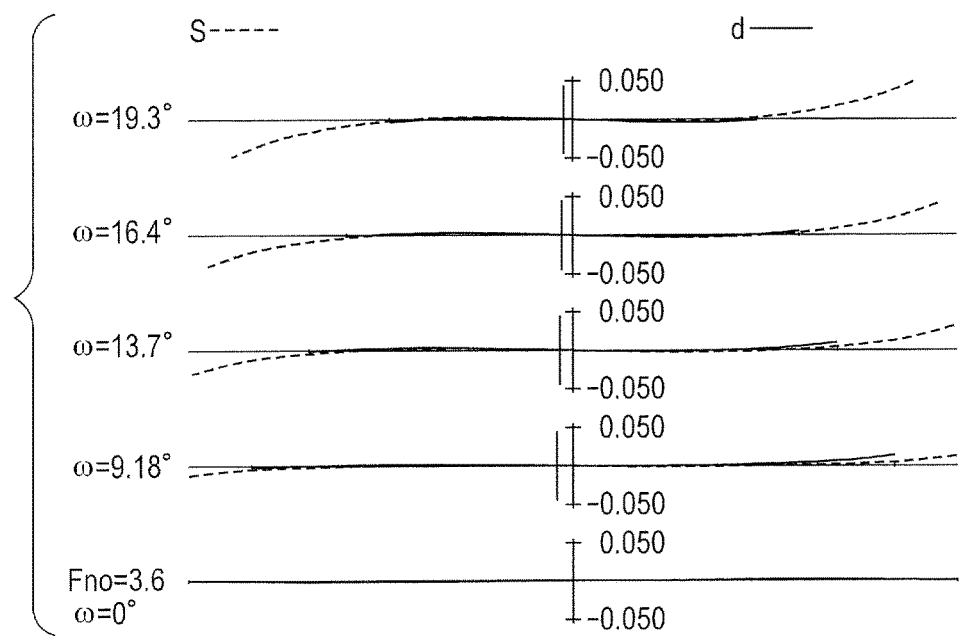
FIG. 7A is a lateral aberration diagram of the optical system according to Embodiment 2 when focusing at infinity.
Figure 7B:
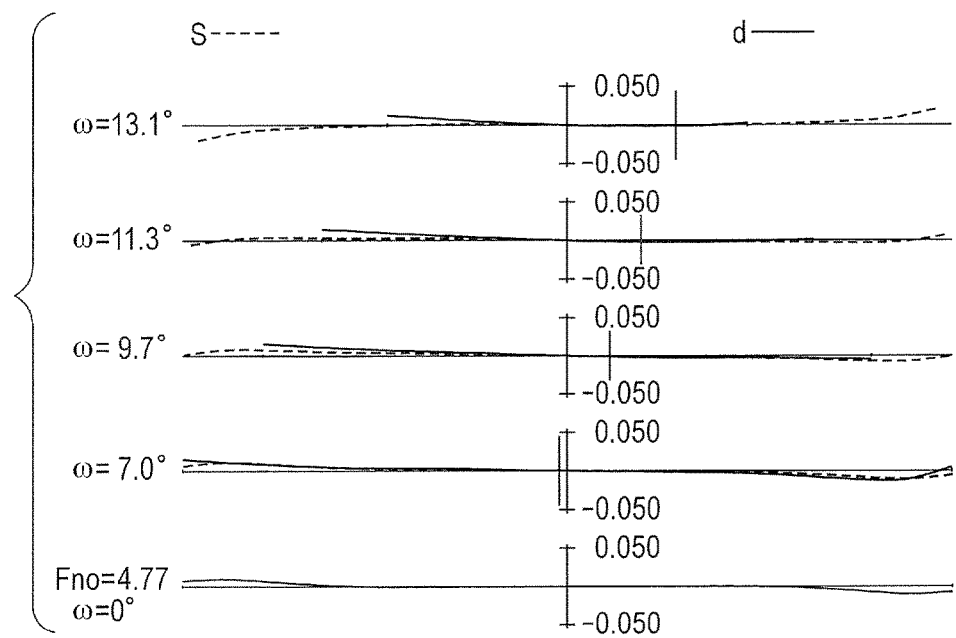
FIG. 7B is a lateral aberration diagram of the optical system according to Embodiment 2 when focusing at the close distance.

FIG. 5A and FIG. 5B are lens cross-sectional views of an optical system according to Embodiment 2 of the present invention when focusing at infinity and when focusing at a close distance, respectively. FIG. 6A and FIG. 6B are longitudinal aberration diagrams of the optical system according to Embodiment 2 when focusing at infinity and when focusing at the close distance, respectively, and when not performing image stabilization. FIG. 7A and FIG. 7B are lateral aberration diagrams of the optical system according to Embodiment 2 when focusing at infinity and when focusing at the close distance, respectively, and when not performing the image stabilization.

Figure 8A:
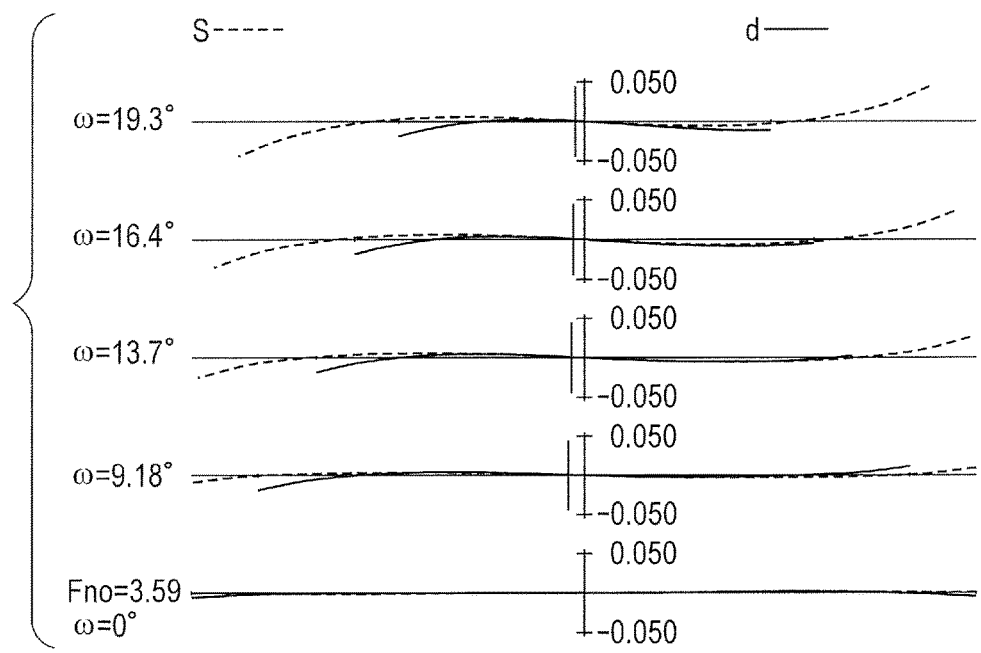
FIG. 8A is a lateral aberration diagram of the optical system according to Embodiment 2 when focusing at infinity and when performing image stabilization.
Figure 8B:
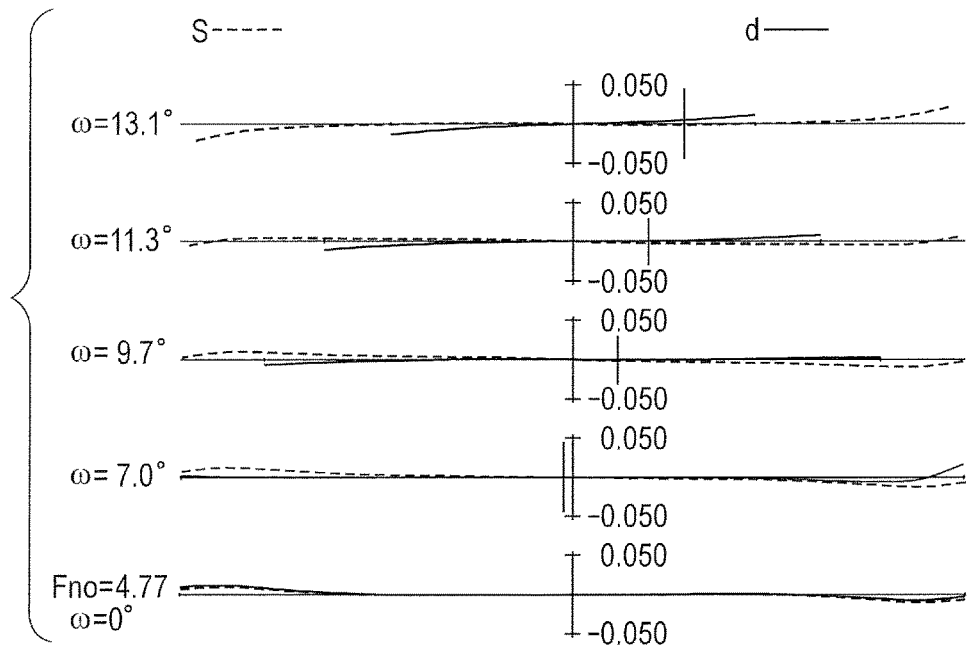
FIG. 8B is a lateral aberration diagram of the optical system according to Embodiment 2 when focusing at the close distance and when performing the image stabilization.

FIG. 8A and FIG. 8B are lateral aberration diagrams of the optical system according to Embodiment 2 when focusing at infinity and when focusing at the close distance, respectively, and when decentering an image stabilizing lens unit so that a change in image forming position is corrected when an angle of an incident ray at the center of an image plane is changed by 0.4°. Embodiment 2 relates to an optical system having an angle of view of 38.6° and an F-number of 3.60.

Figure 9A:
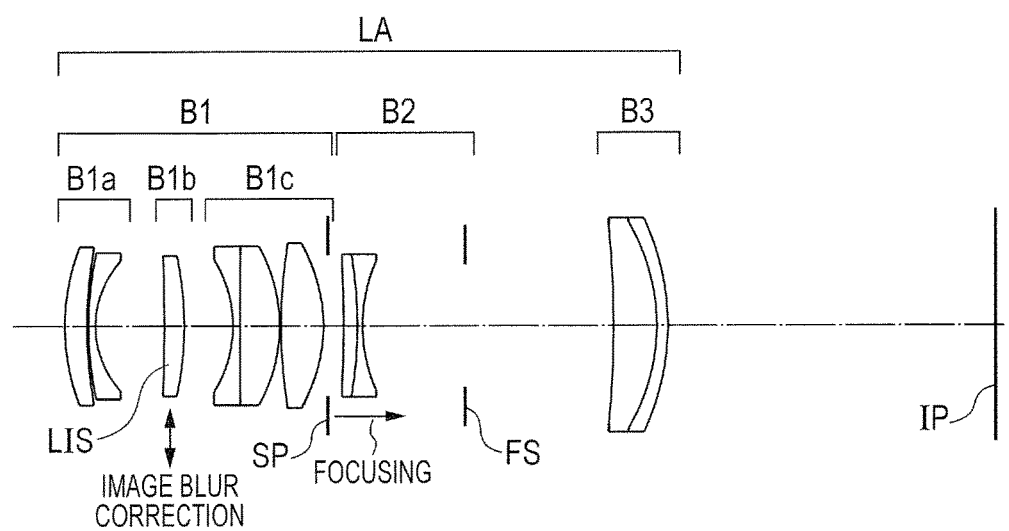
FIG. 9A is a lens cross-sectional view of an optical system according to Embodiment 3 of the present invention when focusing at infinity.
Figure 9B:
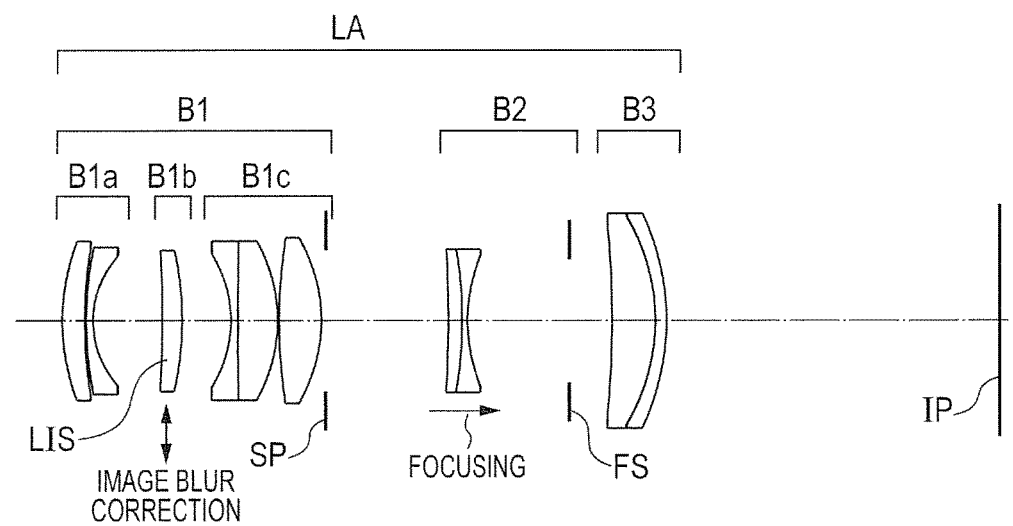
FIG. 9B is a lens cross-sectional view of the optical system according to Embodiment 3 when focusing at a close distance.
Figure 10A:
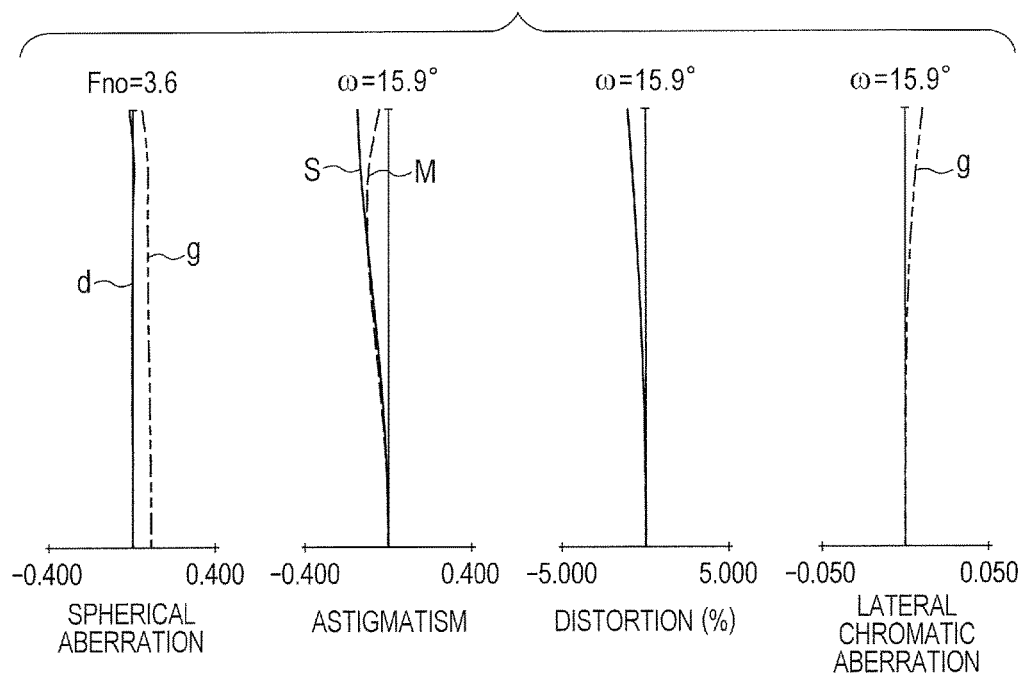
FIG. 10A is a longitudinal aberration diagram of the optical system according to Embodiment 3 when focusing at infinity.
Figure 10B:
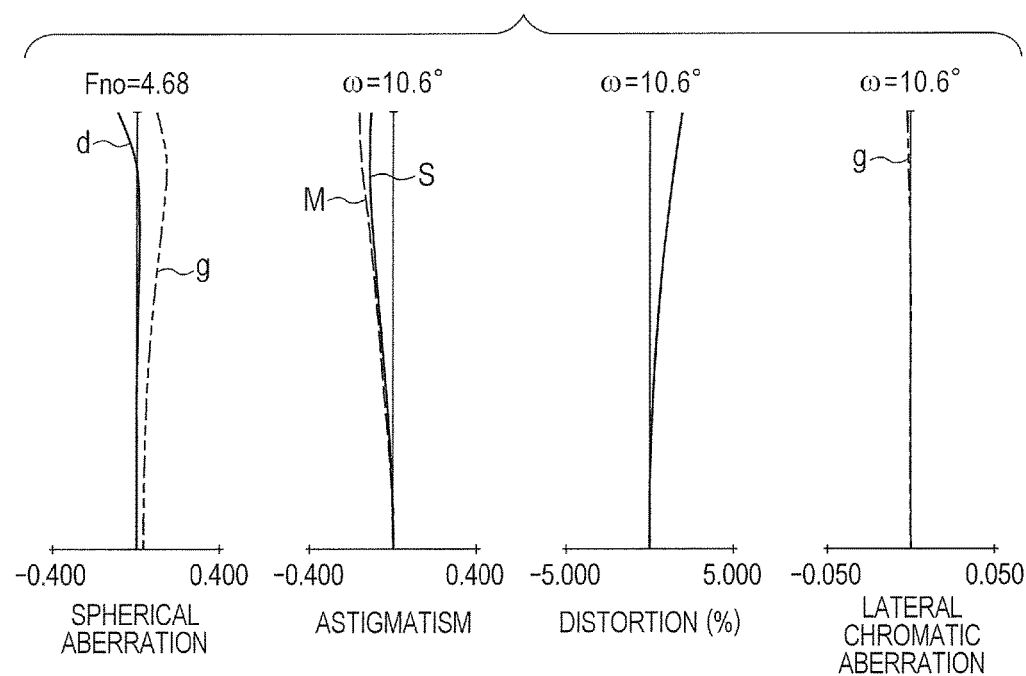
FIG. 10B is a longitudinal aberration diagram of the optical system according to Embodiment 3 when focusing at the close distance.
Figure 11A:
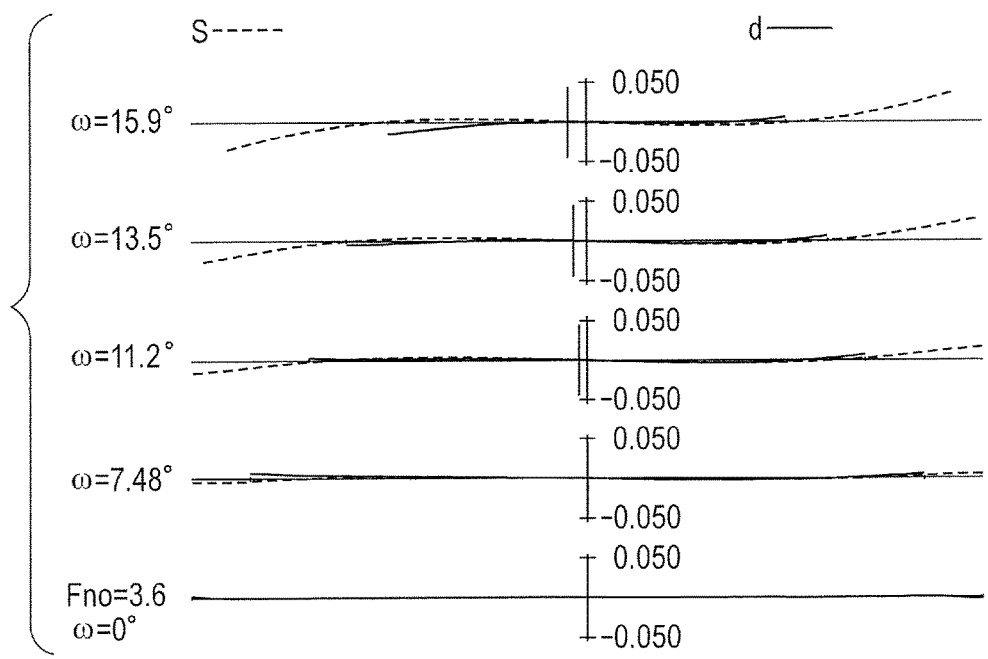
FIG. 11A is a lateral aberration diagram of the optical system according to Embodiment 3 when focusing at infinity.
Figure 11B:
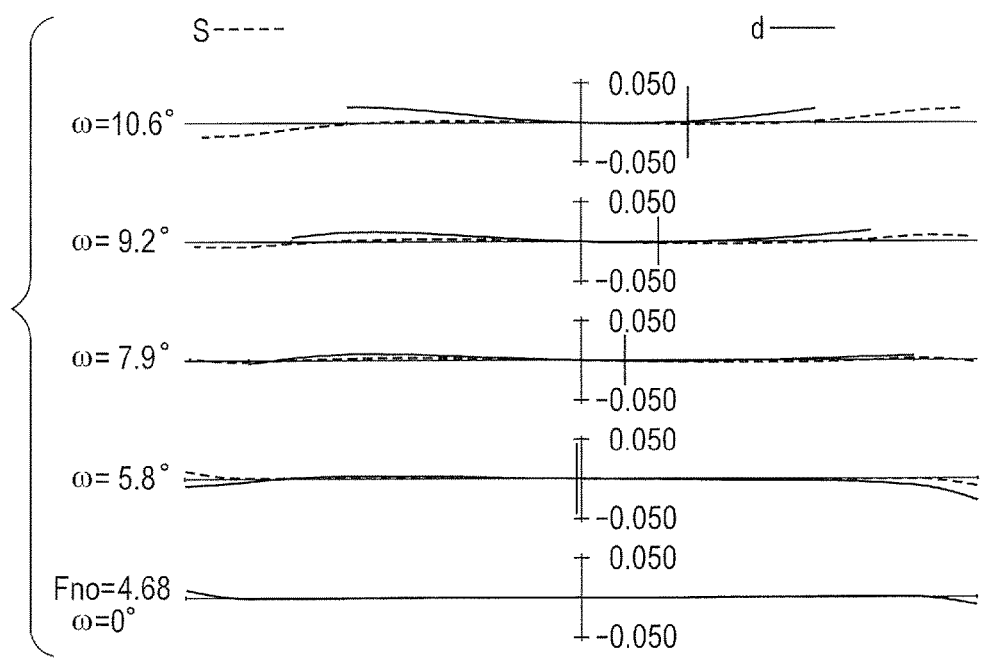
FIG. 11B is a lateral aberration diagram of the optical system according to Embodiment 3 when focusing at the close distance.

FIG. 9A and FIG. 9B are lens cross-sectional views of an optical system according to Embodiment 3 of the present invention when focusing at infinity and when focusing at a close distance, respectively. FIG. 10A and FIG. 10B are longitudinal aberration diagrams of the optical system according to Embodiment 3 when focusing at infinity and when focusing at the close distance, respectively, and when not performing image stabilization. FIG. 11A and FIG. 11B are lateral aberration diagrams of the optical system according to Embodiment 3 when focusing at infinity and when focusing at the close distance, respectively, and when not performing the image stabilization.

Figure 12A:
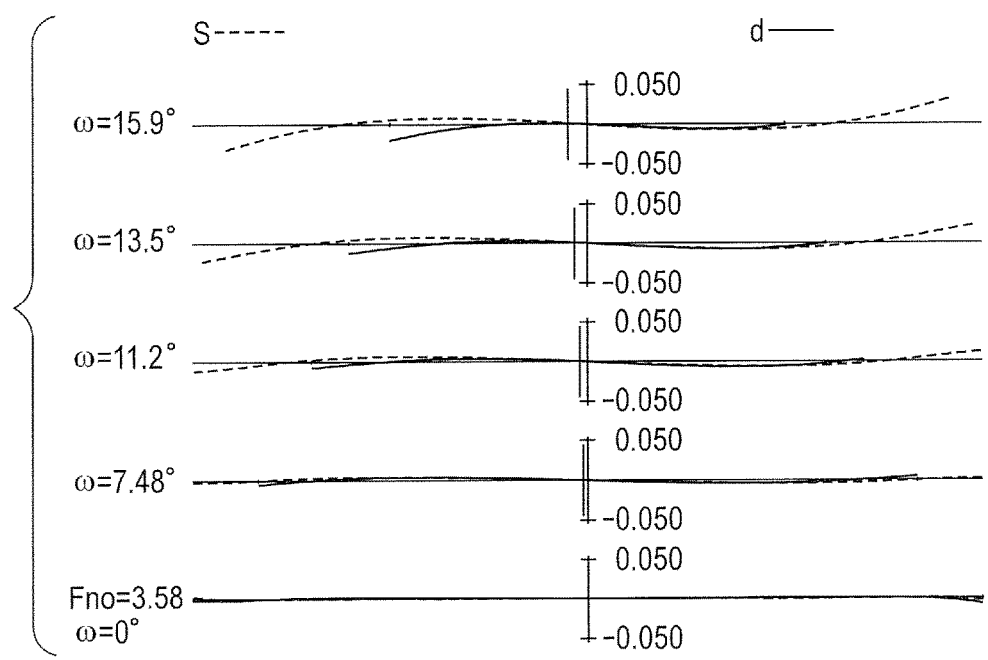
FIG. 12A is a lateral aberration diagram of the optical system according to Embodiment 3 when focusing at infinity and when performing image stabilization.
Figure 12B:
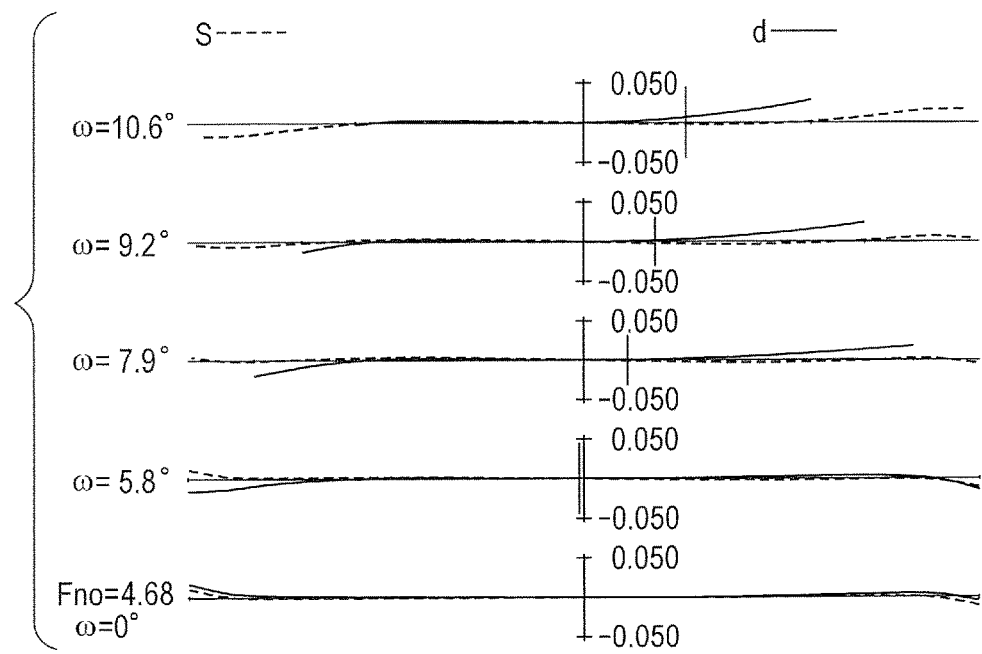
FIG. 12B is a lateral aberration diagram of the optical system according to Embodiment 3 when focusing at the close distance and when performing the image stabilization.

FIG. 12A and FIG. 12B are lateral aberration diagrams of the optical system according to Embodiment 3 when focusing at infinity and when focusing at the close distance, respectively, and when decentering an image stabilizing lens unit so that a change in image forming position is corrected when an angle of an incident ray at the center of an image plane is changed by 0.4°. Embodiment 3 relates to an optical system having an angle of view of 31.78° and an F-number of 3.60.

Figure 13A:
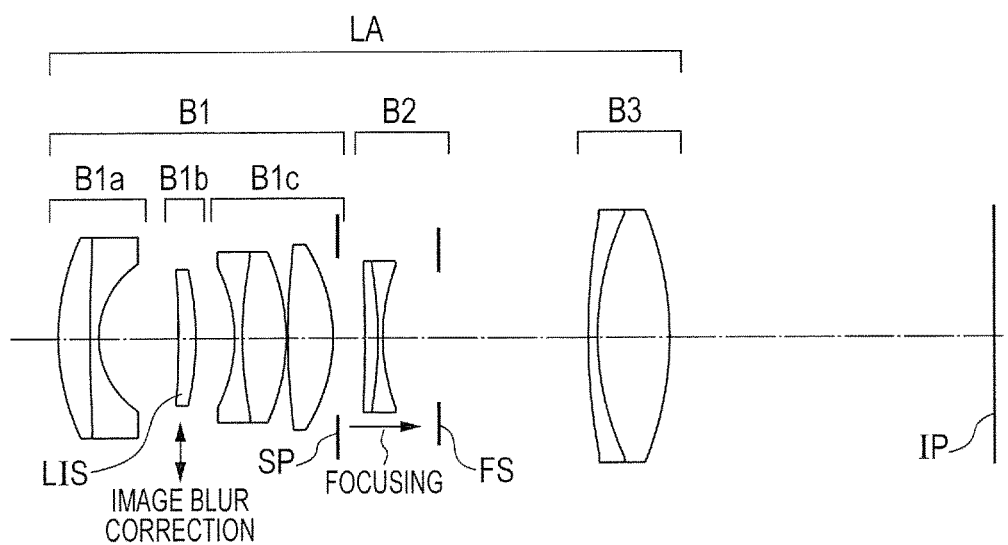
FIG. 13A is a lens cross-sectional view of an optical system according to Embodiment 4 of the present invention when focusing at infinity.
Figure 13B:
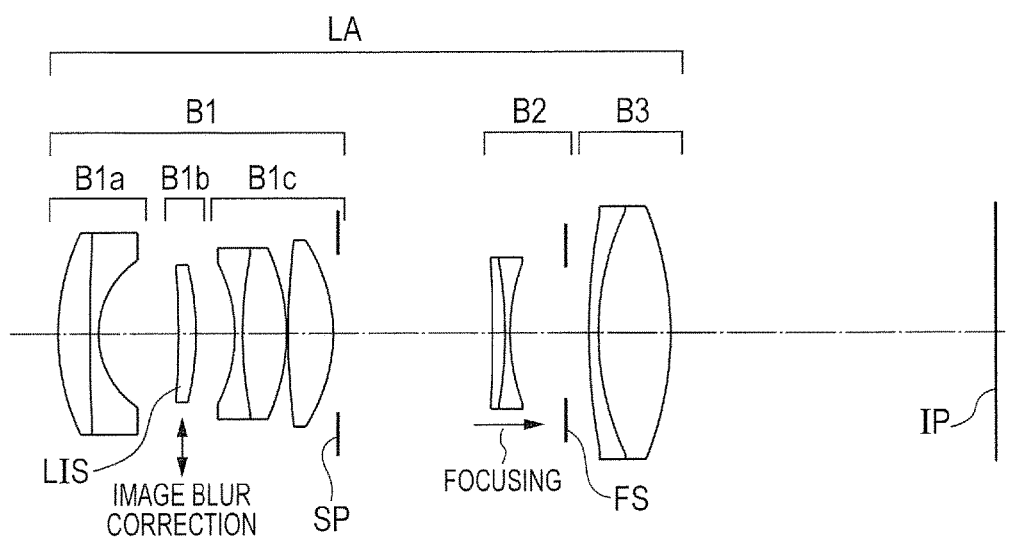
FIG. 13B is a lens cross-sectional view of the optical system according to Embodiment 4 when focusing at a close distance.
Figure 14A:
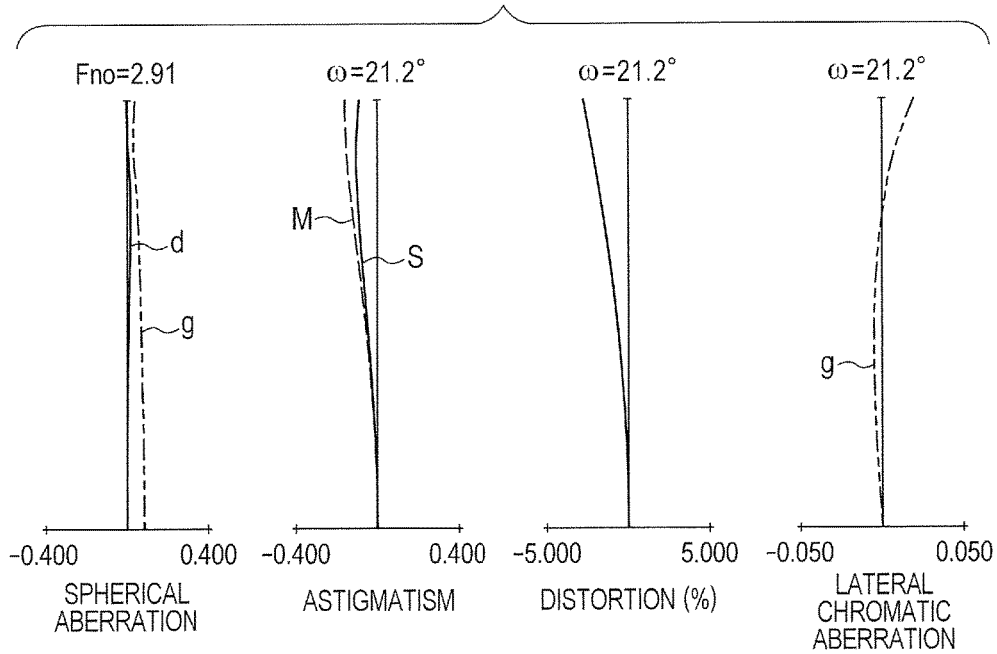
FIG. 14A is a longitudinal aberration diagram of the optical system according to Embodiment 4 when focusing at infinity.
Figure 14B:
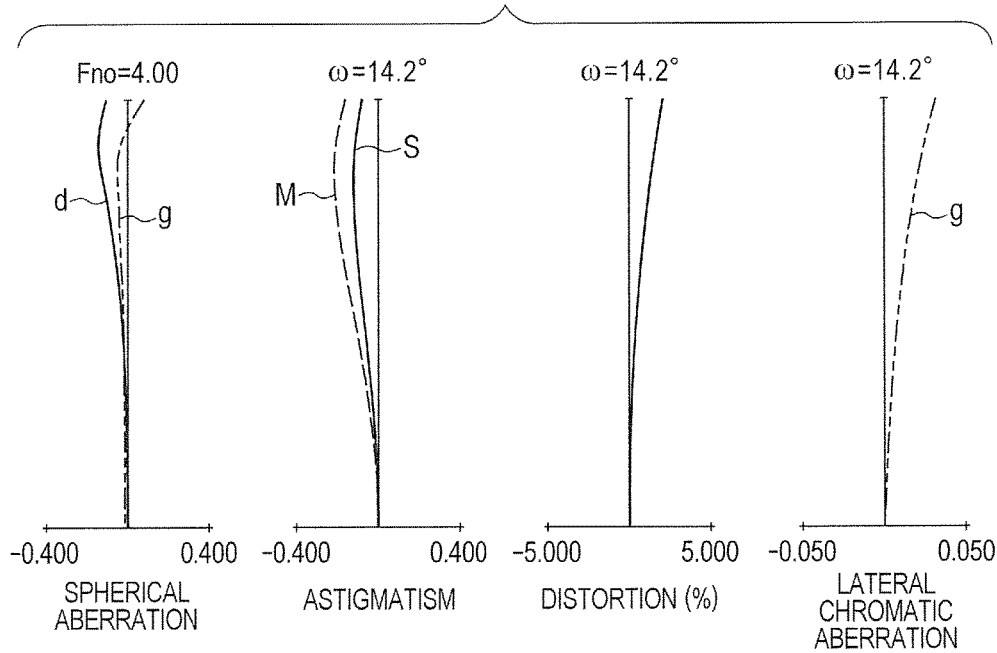
FIG. 14B is a longitudinal aberration diagram of the optical system according to Embodiment 4 when focusing at the close distance.
Figure 15A:
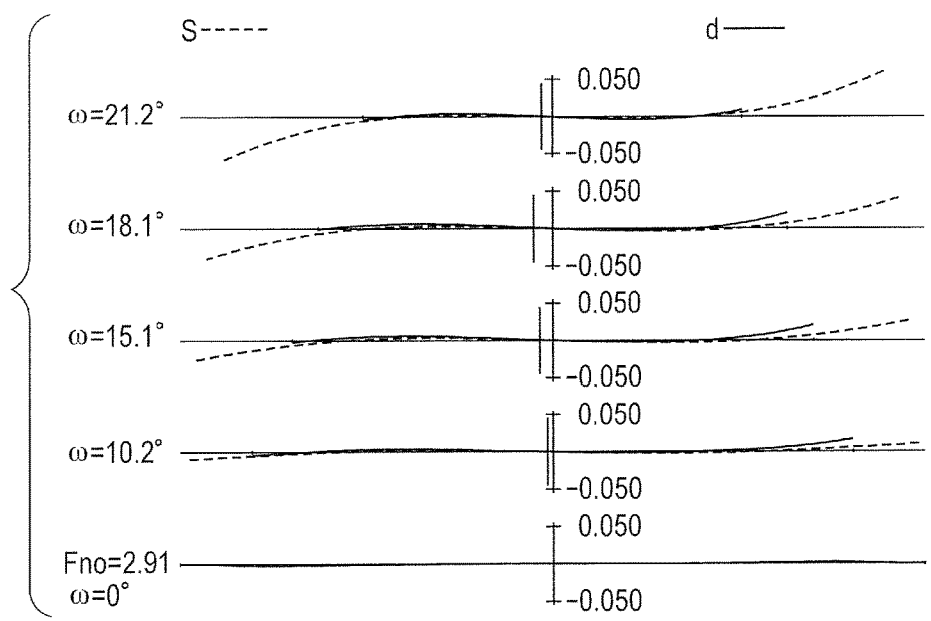
FIG. 15A is a lateral aberration diagram of the optical system according to Embodiment 4 when focusing at infinity.
Figure 15B:
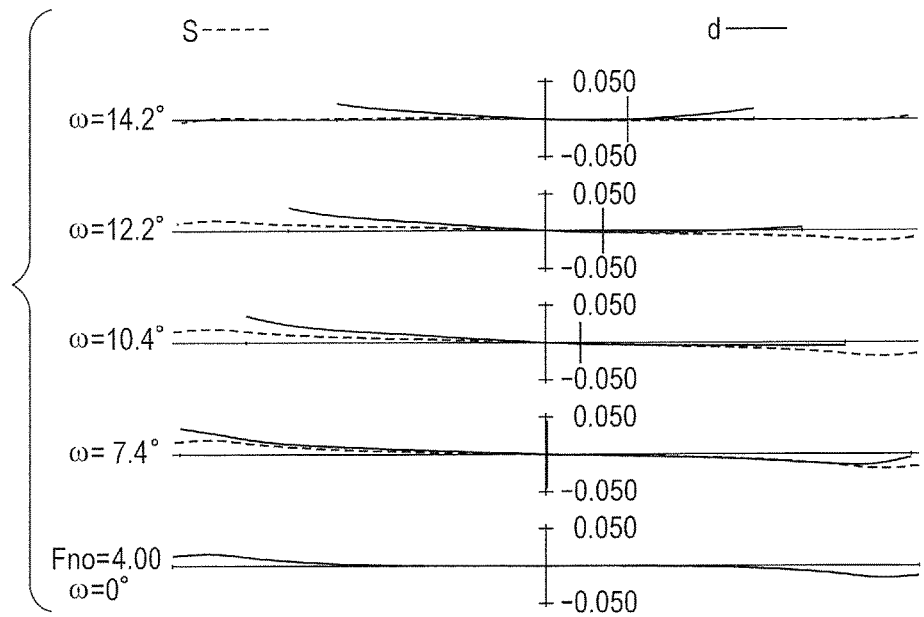
FIG. 15B is a lateral aberration diagram of the optical system according to Embodiment 4 when focusing at the close distance.

FIG. 13A and FIG. 13B are lens cross-sectional views of an optical system according to Embodiment 4 of the present invention when focusing at infinity and when focusing at a close distance, respectively. FIG. 14A and FIG. 14B are longitudinal aberration diagrams of the optical system according to Embodiment 4 when focusing at infinity and when focusing at the close distance, respectively, and when not performing image stabilization. FIG. 15A and FIG. 15B are lateral aberration diagrams of the optical system according to Embodiment 4 when focusing at infinity and when focusing at the close distance, respectively, and when not performing the image stabilization.

Figure 16A:
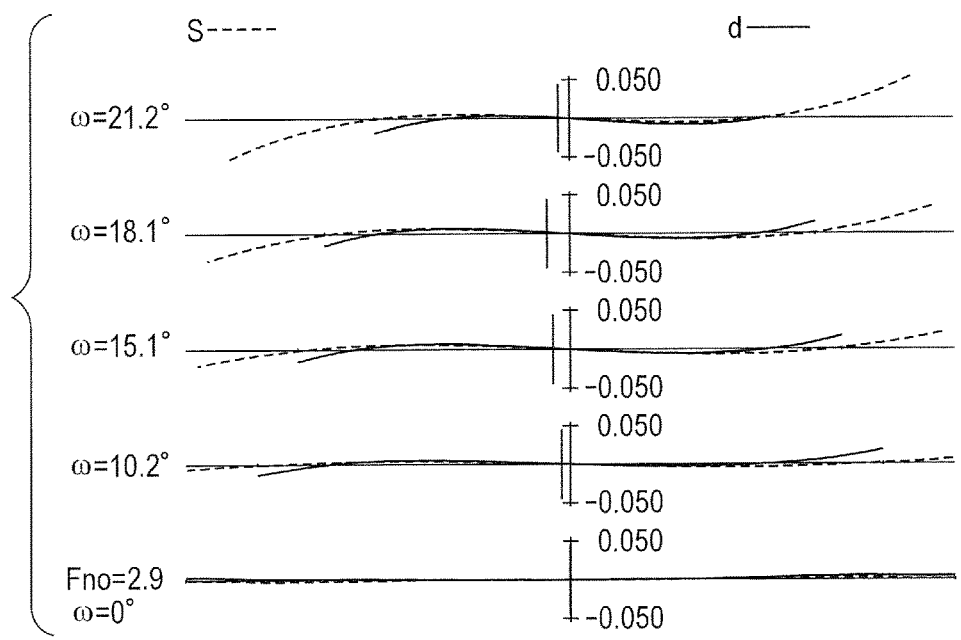
FIG. 16A is a lateral aberration diagram of the optical system according to Embodiment 4 when focusing at infinity and when performing image stabilization.
Figure 16B:
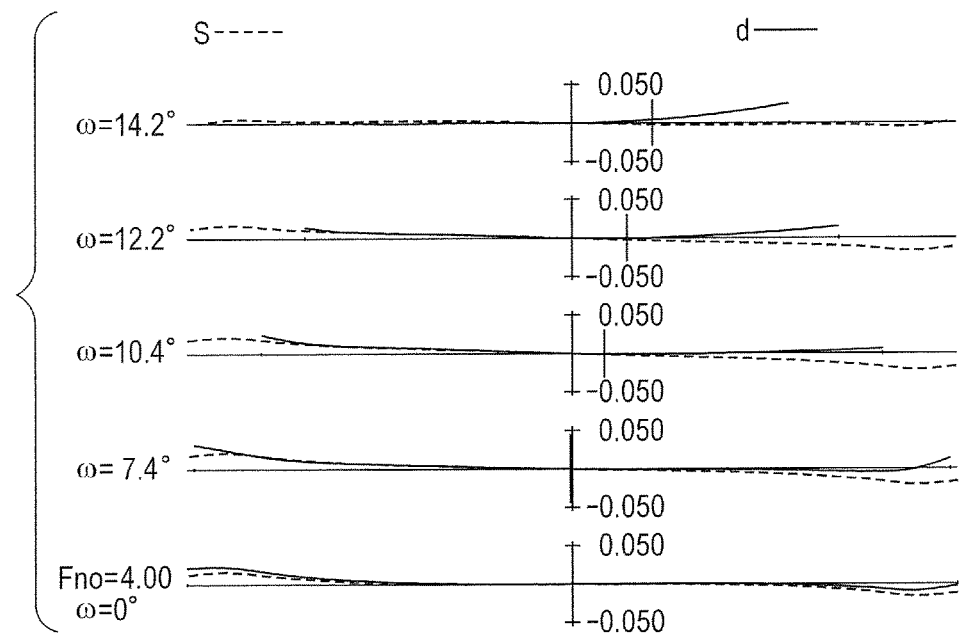
FIG. 16B is a lateral aberration diagram of the optical system according to Embodiment 4 when focusing at the close distance and when performing the image stabilization.

FIG. 16A and FIG. 16B are lateral aberration diagrams of the optical system according to Embodiment 4 when focusing at infinity and when focusing at the close distance, respectively, and when decentering an image stabilizing lens unit so that a change in image forming position is corrected when an angle of an incident ray at the center of an image plane is changed by 0.4°. Embodiment 4 relates to an optical system having an angle of view of 42.48° and an F-number of 2.91.

Figure 17A:
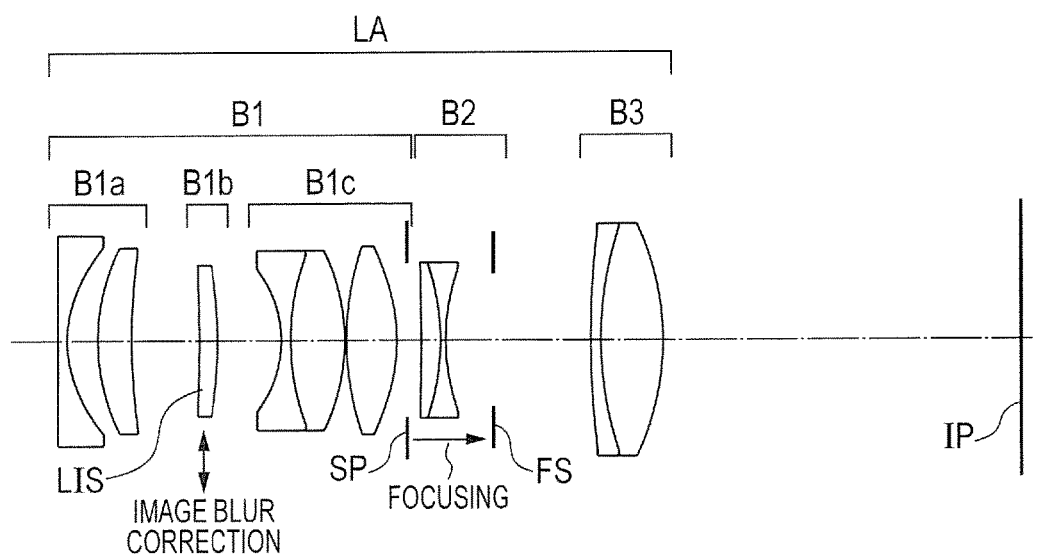
FIG. 17A is a lens cross-sectional view of an optical system according to Embodiment 5 of the present invention when focusing at infinity.
Figure 17B:
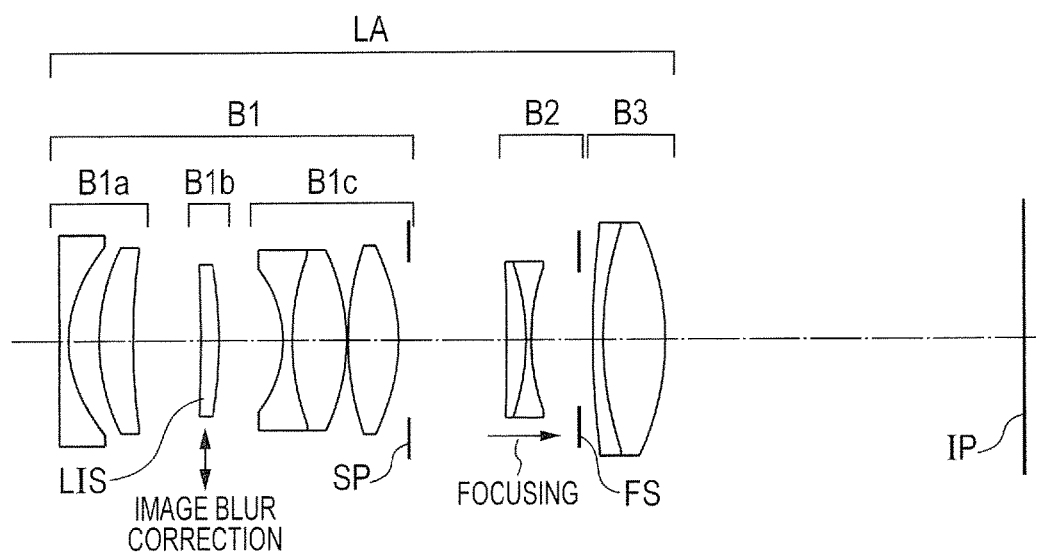
FIG. 17B is a lens cross-sectional view of the optical system according to Embodiment 5 when focusing at a close distance.
Figure 18A:
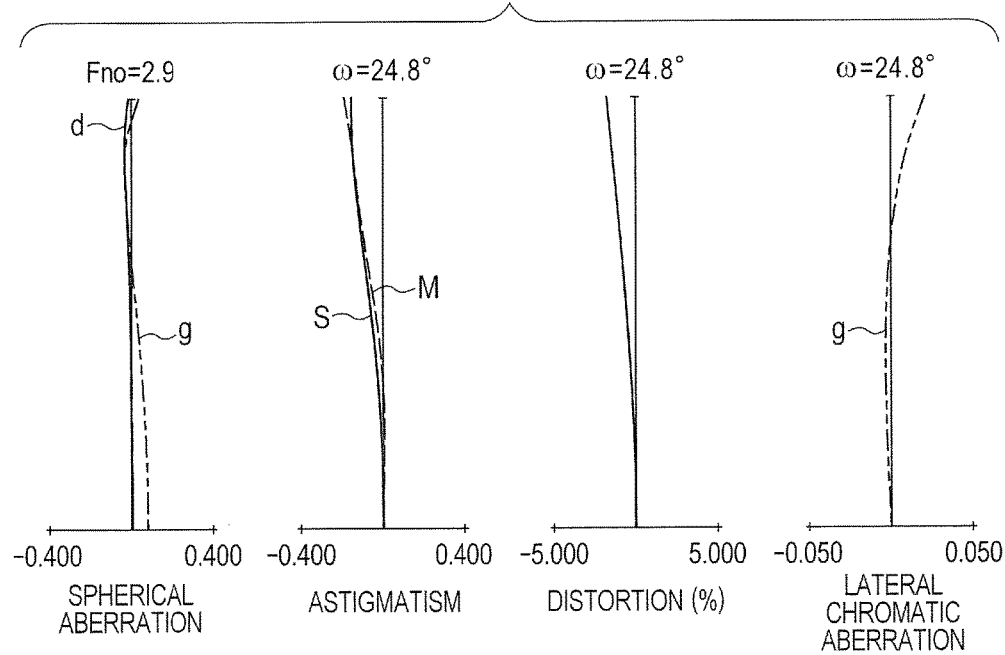
FIG. 18A is a longitudinal aberration diagram of the optical system according to Embodiment 5 when focusing at infinity.
Figure 18B:
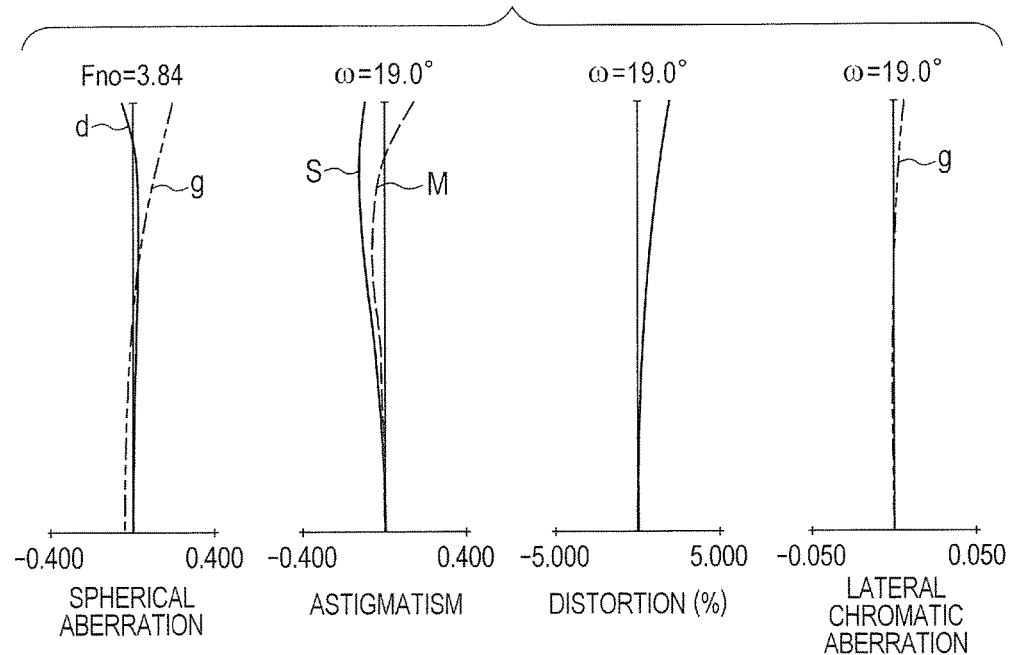
FIG. 18B is a longitudinal aberration diagram of the optical system according to Embodiment 5 when focusing at the close distance.
Figure 19A:
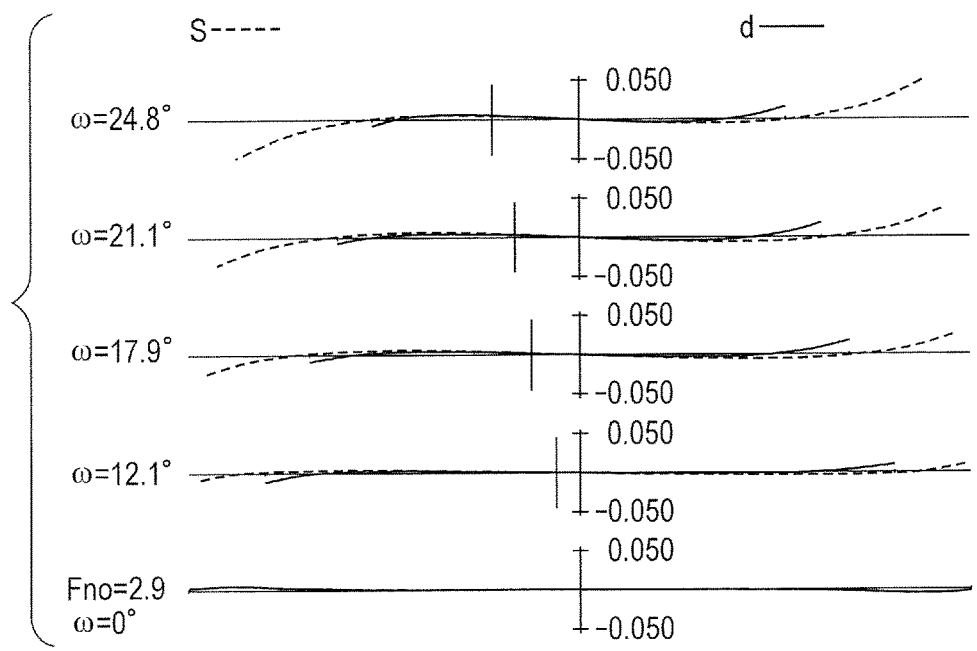
FIG. 19A is a lateral aberration diagram of the optical system according to Embodiment 5 when focusing at infinity.
Figure 19B:
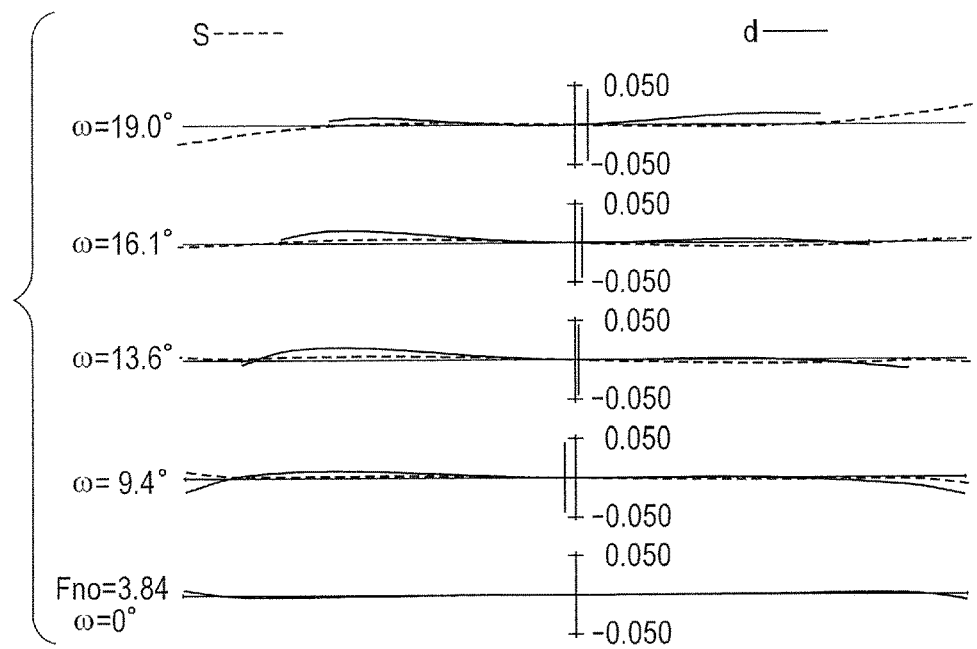
FIG. 19B is a lateral aberration diagram of the optical system according to Embodiment 5 when focusing at the close distance.

FIG. 17A and FIG. 17B are lens cross-sectional views of an optical system according to Embodiment 5 of the present invention when focusing at infinity and when focusing at a close distance, respectively. FIG. 18A and FIG. 18B are longitudinal aberration diagrams of the optical system according to Embodiment 5 when focusing at infinity and when focusing at the close distance, respectively, and when not performing image stabilization. FIG. 19A and FIG. 19B are lateral aberration diagrams of the optical system according to Embodiment 5 when focusing at infinity and when focusing at the close distance, respectively, and when not performing the image stabilization.

Figure 20A:
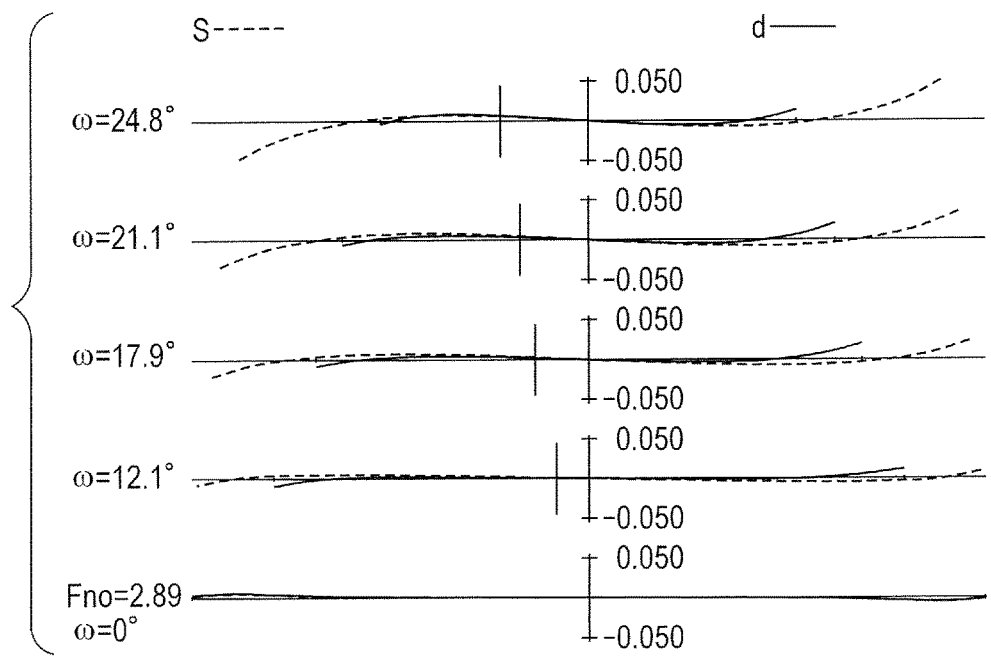
FIG. 20A is a lateral aberration diagram of the optical system according to Embodiment 5 when focusing at infinity and when performing image stabilization.
Figure 20B:
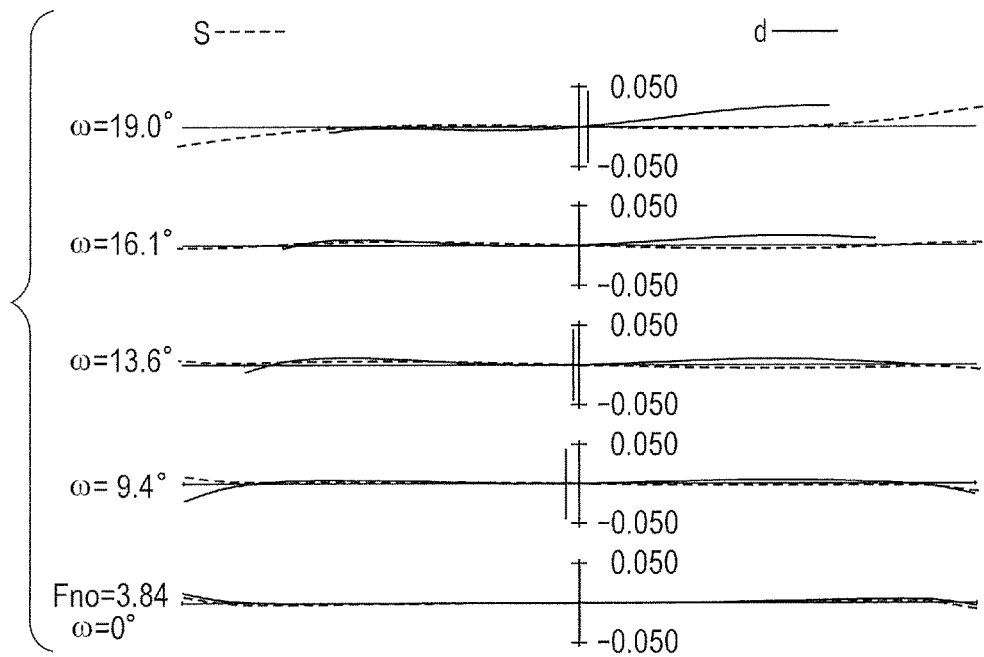
FIG. 20B is a lateral aberration diagram of the optical system according to Embodiment 5 when focusing at the close distance and when performing the image stabilization.
Figure 21:
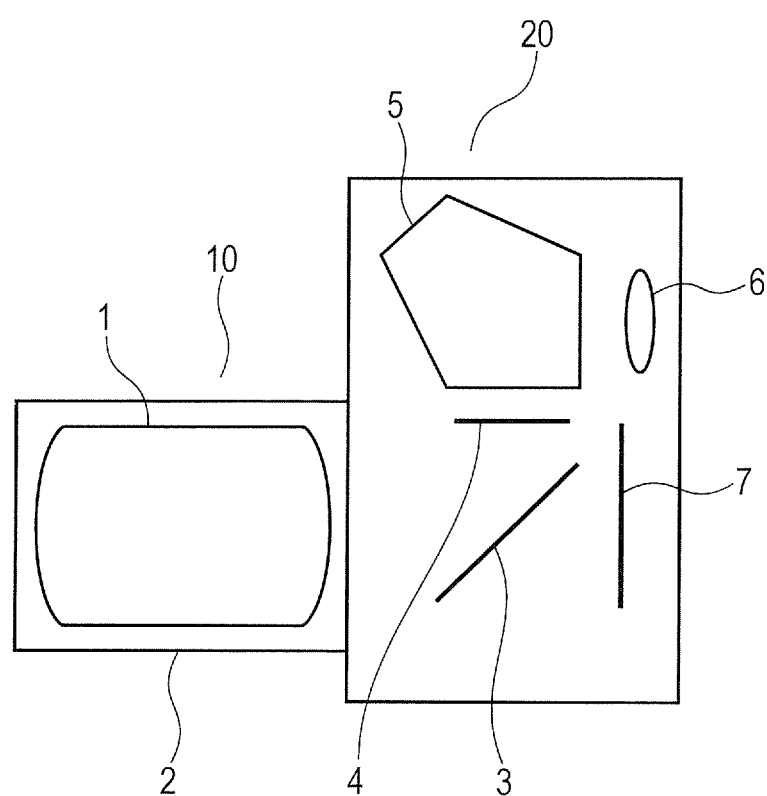
FIG. 21 is a schematic diagram of a main part of an image pickup apparatus according to the present invention.

FIG. 20A and FIG. 20B are lateral aberration diagrams of the optical system according to Embodiment 5 when focusing at infinity and when focusing at the close distance, respectively, and when decentering an image stabilizing lens unit so that a change in image forming position is corrected when an angle of an incident ray at the center of an image plane is changed by 0.4°. Embodiment 5 relates to an optical system having an angle of view of 49.7° and an F-number of 2.90. FIG. 21 is a schematic diagram of a main part of an image pickup apparatus according to the present invention.

The optical system according to each of Embodiments 1 to 5 is an image pickup lens system used with an image pickup apparatus, for example, a video camera, a digital still camera, a monitoring camera, or a silver-halide film camera. The optical system according to each of Embodiments 1 to 5 may also be used as a projection optical system for a projection apparatus (projector). In the lens cross-sectional views, the left side is an object side (front side), and the right side is an image side (rear side).

An optical system LA includes, in order from the object side to the image side, a first lens unit B1 having a positive refractive power, a second lens unit B2 having a negative refractive power, and a third lens unit B3 having a positive refractive power. The first lens unit B1 consists of, in order from the object side to the image side, a first lens sub-unit B1a having a negative refractive power, which is configured not to move during the image stabilization, a second lens sub-unit B1b having a positive refractive power, which is configured to move during the image stabilization, and a third lens sub-unit B1c, which is configured not to move during the image stabilization.

An aperture stop SP is arranged between the first lens unit B1 and the second lens unit B2 to determine (restrict) a ray at an open F-number (Fno). In order to adjust (change) the F-number during image taking, a diameter of the aperture stop SP is electrically or mechanically variable. A flare cut stop FS is arranged between the second lens unit B2 and the third lens unit B3. The flare cut stop FS is a stop for preventing flare and ghost, and has a fixed aperture diameter. The flare cut stop FS is configured to move along the same locus as that of the second lens unit B2.

An image plane IP corresponds to an image pickup plane of a solid-state image pickup element (photo-electric conversion element) such as a CCD sensor or a CMOS sensor when the zoom lens of the present invention is used as an image pickup optical system of a video camera or a digital still camera. Further, the image plane IP corresponds to a photosensitive surface corresponding to a film surface when the zoom lens of the present invention is used as an image pickup optical system of a silver-halide film camera. The arrows regarding focusing indicate directions of movements of the lens units during focusing from infinity to the close distance.

In aberration diagrams of each of Embodiments 1 to 5, an F-number is represented by Fno, and a half angle of view (degrees) is represented by ω, and is an angle of view for a paraxial ray. In spherical aberration diagrams, a d-line (wavelength: 587.6 nm) is denoted by d, and a g-line (wavelength: 435.8 nm) is denoted by g. In astigmatism diagrams, a sagittal image plane of the d-line is denoted by S, and a meridional image plane of the d-line is denoted by M. Distortion is shown for the d-line. In lateral chromatic aberration diagrams, a g-line is denoted by g.

The optical system LA according to the present invention consists of, in order from the object side to the image side, the first lens unit B1 having the positive refractive power, the second lens unit B2 having the negative refractive power, and the third lens unit B3 having the positive refractive power. The second lens unit B2 is used for focusing. Lens units having positive refractive powers are arranged on the object side and the image side of the second lens unit B2, respectively, to reduce an effective lens diameter of the second lens unit. Moreover, such refractive power arrangement is adopted so that a distance by which the second lens unit B2 is moved from when focusing at infinity to when focusing at a close distance is also reduced.

Further, the first lens unit B1 includes, in order from the object side to the image side, the first lens sub-unit B1a having the negative refractive power, the second lens sub-unit B1b having the positive refractive power, and the third lens sub-unit B1c. The second lens sub-unit B1b is an image stabilizing lens unit, which is configured to move in a direction having a component in a direction perpendicular to an optical axis to perform the image stabilization.

The first lens sub-unit B1a has the negative refractive power to shorten an entrance pupil of the optical system, to thereby reduce an effective lens diameter of the second lens sub-unit B1b, that is, an effective lens diameter of the image stabilizing lens unit. Moreover, the second lens sub-unit B1b having the positive refractive power is used for the image stabilization to satisfactorily maintain optical performance in the vicinity of the image plane when performing the image stabilization.

The optical system LA has an arrangement of the lens units having the positive, negative, and positive refractive powers in the stated order from the object side to the image side, and the second lens unit B2 having the negative refractive power is used for focusing, to thereby downsize the entire optical system. Further, the first lens unit B1 having the positive refractive power includes the following sub-units: the first lens sub-unit B1a, the second lens sub-unit B1b, and the third lens sub-unit B1c, and the second lens sub-unit B1b having the positive refractive power is used for the image stabilization. As a result, optical performance when not performing the image stabilization and when performing the image stabilization is satisfactorily corrected while downsizing the optical system.

The first lens unit B1 and the third lens unit B3 are configured not to move during focusing. The second lens unit B2 consists of a cemented lens formed by cementing a positive lens and a negative lens, to thereby reduce a variation in lateral chromatic aberration during focusing. A distance (total lens length) from a lens surface closest to the object side in the first lens unit B1 to the image plane when focusing at infinity is represented by DL. A distance from a lens surface closest to the object side in the second lens sub-unit B1b to the image plane when focusing at infinity is represented by DB.

At this time, the following conditional expression is satisfied:

$$0.78 < DB/DL < 0.95 \qquad (1).$$

When optical members effectively having no refractive power, such as a cover glass and a low-pass filter are arranged on the image side of the last lens, a length in air of those optical members is used. Similarly for the distance from the lens surface on the object side in the second lens sub-unit B1b to the image plane, when members having no refractive power, such as a low-pass filter is arranged therein, a length in air of those members is used.

Conditional Expression (1) is an expression for defining a position of the second lens sub-unit B1b (image stabilizing lens unit) on the optical axis. When the ratio falls below the lower limit value of Conditional Expression (1), the second lens sub-unit B1b is arranged at a position closer to the image side. With such optical arrangement, it is easy to satisfactorily maintain the optical performance when performing the image stabilization, but the effective diameter of the second lens sub-unit B1b is disadvantageously increased, with the result that it becomes difficult to downsize the optical system.

Meanwhile, when the ratio exceeds the upper limit value of Conditional Expression (1), the second lens sub-unit B1b is brought too close to the object side, with the result that the effective diameter of the second lens sub-unit B1b is disadvantageously increased because the effective diameter is determined by an off-axial ray. In addition, an absolute value of an incident height of the off-axial ray when passing through the second lens sub-unit B1b is also increased, and hence large off-axial aberrations (in particular, field curvature and distortion) tend to occur when performing the image stabilization, with the result that it becomes difficult to satisfactorily maintain the optical performance when performing the image stabilization. Conditional Expression (1) is satisfied to facilitate downsizing of the entire optical system while satisfactorily maintaining the optical performance when performing the image stabilization.

As described above, according to the present invention, the lens units are arranged appropriately to satisfy Conditional Expression (1), with the result that the optical system having a small size as a whole and excellent image quality can be obtained.

In the present invention, it is further preferred to satisfy one of the conditional expressions provided below. A focal length of the optical system LA is represented by f, and a focal length of the third lens unit B3 is represented by f3. The third lens sub-unit B1c has a positive refractive power. A focal length of the third lens sub-unit B1c is represented by f1C. A focal length of the second lens unit B2 is represented by f2. A lateral magnification of the second lens unit B2 when focusing at infinity is represented by β2, and a lateral magnification of the third lens unit B3 when focusing at infinity is represented by β3. The second lens sub-unit B1b includes a meniscus positive lens LIS having a concave surface facing the object side.

It is preferred that the second lens sub-unit B1b consist of the meniscus positive lens LIS having the concave surface facing the object side. A refractive index of a material of the positive lens LIS is represented by Nd_LIS. A lateral magnification of the entire optical system when focusing at a minimum object distance is represented by β. It should be noted, however, that the minimum object distance is a value when an image pickup magnification is −1a.

In this case, it is preferred that at least one of the following conditional expressions be satisfied:

$$0.2 < f3/f < 5.0 \quad (2);$$

$$0.1 < f1C/f < 3.0 \quad (3);$$

$$0.1 < |f2|/f < 3.0 \quad (4);$$

$$|(1-β2^2) \times (β3^2)| > 2.0 \quad (5);$$

$$Nd\_LIS > 1.70 \quad (6); \text{ and}$$

$$-β > 0.49 \quad (7).$$

Next, technical meanings of the above-mentioned conditional expressions are described. Conditional Expression (2) defines the positive refractive power of the third lens unit B3. When the ratio exceeds the upper limit value of Conditional Expression (2), the positive refractive power of the third lens unit B3 is too weak, with the result that it becomes difficult to downsize the second lens unit B2, which is a focus lens unit. Moreover, when the ratio falls below the lower limit value of Conditional Expression (2), it becomes easy to downsize the second lens unit B2, but the positive refractive power of the third lens unit B3 becomes much stronger, with the result that coma and astigmatism are increased during focusing. Further, it becomes difficult to suppress variations in those various aberrations during focusing.

Conditional Expression (2) is satisfied to easily secure high optical performance while downsizing the entire optical system. Moreover, in the optical system according to the present invention, the third lens sub-unit B1c, which is a lens sub-unit in the first lens unit B1, has the positive refractive power to easily correct spherical aberration and coma, which occur in the first lens sub-unit B1a having the negative refractive power, with the result that excellent optical performance may be obtained.

Conditional Expression (3) defines the positive refractive power of the third lens sub-unit B1c. When the ratio exceeds the upper limit value of Conditional Expression (3), the positive refractive power of the third lens sub-unit B1c is too weak, and the positive refractive power of the second lens sub-unit B1b needs to be increased to maintain the refractive power of the entire first lens unit B1. When the positive refractive power of the second lens sub-unit B1b is increased, it becomes easy to increase image stabilization sensitivity, but it becomes difficult to satisfactorily maintain the optical performance when performing the image stabilization. The term "image stabilization sensitivity" as used herein means a change in angle of a principal ray on an incident side of a ray that forms an image at an image height of 0 mm (center of the image plane) with respect to a movement amount of the second lens sub-unit B1b for the image stabilization in the direction perpendicular to the optical axis.

Meanwhile, when the ratio falls below the lower limit value of Conditional Expression (3), the positive refractive power of the third lens sub-unit B1c becomes much stronger. The optical system according to the present invention has a feature that large spherical aberration occurs in the third lens sub-unit B1c because an axial ray passes through the highest position in the third lens sub-unit B1c. Therefore, when the positive refractive power of the third lens sub-unit B1c is too strong, the spherical aberration is increased, and a variation in spherical aberration during focusing is also increased, with the result that it becomes difficult to obtain the high optical performance over the entire object distance. Therefore, Conditional Expression (3) is satisfied to easily and satisfactorily maintain optical performance when performing the image stabilization and when not performing the image stabilization.

Conditional Expression (4) defines the negative refractive power of the second lens unit B2. When the ratio exceeds the upper limit value of Conditional Expression (4), the negative refractive power of the second lens unit B2 is too weak, with the result that the distance by which the second lens unit B2 is moved during focusing from infinity to the close distance is disadvantageously increased, and that it becomes difficult to downsize the optical system.

Meanwhile, when the ratio falls below the lower limit value of Conditional Expression (4), the negative refractive power of the second lens unit B2 becomes much stronger to increase lateral chromatic aberration and distortion, and hence variations in those various aberrations during focusing are increased, with the result that it becomes difficult to obtain the high optical performance over the entire object distance. Conditional Expression (4) is satisfied to easily downsize the optical system and obtain the high optical performance over the entire object distance.

Conditional Expression (5) defines focus sensitivity of the second lens unit B2 (ratio of a movement amount of a position of the image plane when the focus lens unit is moved by a unit amount in the optical axis direction). The focus sensitivity of the second lens unit B2 in the optical system including the third lens unit B3 is expressed as follows:

$$|(1-β2^2) \times (β3^2)|.$$

When the value falls below the lower limit value of Conditional Expression (5), the focus sensitivity is reduced. Therefore, a distance by which the focus lens unit is moved while taking an image at the close distance is disadvantageously increased, and it becomes difficult to downsize the optical system. Therefore, Conditional Expression (5) is satisfied to easily downsize the optical system.

Conditional Expression (6) defines the refractive index of the material of the positive lens LIS included in the second lens sub-unit B1b (image stabilizing lens unit). When the value falls below the lower limit value of Conditional Expression (6), it becomes difficult to reduce field curvature and astigmatism that occur (change) when performing the image stabilization. In addition, a thickness (center thickness) of a lens required to have the same refractive power is disadvantageously increased, and it becomes difficult to reduce the weight of the lens. Conditional Expression (6) is satisfied to easily downsize the lens and satisfactorily maintain the optical performance when performing the image stabilization.

Conditional Expression (7) defines an absolute value (so-called "maximum photographic magnification") of a magnification of an image when focusing at the close distance. When the value falls below the lower limit value of Conditional Expression (7), it becomes difficult to exert the effect as a macro lens. Moreover, in the present invention, it is preferred that the positive lens LIS included in the second lens sub-unit B1*b* (that is, image stabilizing lens unit) have a meniscus shape with the concave surface facing the object side.

When the positive lens LIS has a biconvex shape, or a meniscus shape with a convex surface facing the object side, large coma occurs when performing the image stabilization, and it becomes disadvantageously difficult to suppress occurrence of coma. Therefore, the positive lens LIS has the meniscus shape with the concave surface facing the object side to easily and satisfactorily maintain the optical performance when performing the image stabilization.

In the present invention, it is further preferred that the second lens sub-unit B1*b* consist of one lens (that is, only the lens LIS). When the second lens sub-unit B1*b* consists of two or more lenses, the second lens sub-unit B1*b* is disadvantageously increased in weight and size, and it becomes difficult to downsize the optical system.

In the present invention, it is more preferred that the first lens unit B1 be configured not to move during focusing. When not only the second lens unit B2 but also the first lens unit B1 is driven during focusing, it is advantageous in maintaining optical performance when varying the object distance. However, a driving mechanism for moving the first lens unit B1, which is large in effective diameter and has a heavy weight as compared to the second lens unit B2, is additionally required, and it becomes difficult to downsize the optical system.

Similarly, it is preferred that the third lens unit B3 be configured not to move during focusing. When not only the second lens unit B2 but also the third lens unit B3 is driven during focusing, it is advantageous in maintaining optical performance when varying the object distance. However, a driving mechanism for moving the third lens unit B3, which is large in effective diameter and has a heavy weight as compared to the second lens unit B2, is additionally required, and it becomes difficult to downsize the optical system.

As described above, according to the present invention, the optical system having an image stabilizing function, which has a small size as a whole and the excellent image quality, can be provided.

It is further preferred that the numerical ranges of Conditional Expressions (1) to (7) be set as follows:

$$0.80 < DB/DL < 0.93 \quad (1a);$$

$$0.7 < f3/f < 3.0 \quad (2a);$$

$$0.3 < f1C/f < 1.0 \quad (3a);$$

$$0.4 < |f21|/f < 1.5 \quad (4a);$$

$$|(1-\beta2^2) \times (\beta3^2)| > 2.5 \quad (5a);$$

$$Nd\_LIS > 1.74 \quad (6a); \text{ and}$$

$$-\beta > 0.69 \quad (7a).$$

It is further preferred that the numerical ranges of Conditional Expressions (1a) to (7a) be set as follows:

$$0.84 < DB/DL < 0.92 \quad (1b);$$

$$1.0 < f3/f < 1.8 \quad (2b);$$

$$0.5 < f1C/f < 0.7 \quad (3b);$$

$$0.6 < |f21|/f < 1.0 \quad (4b);$$

$$|(1-\beta2^2) \times (\beta3^2)| > 2.7 \quad (5b);$$

$$Nd\_LIS > 1.76 \quad (6b); \text{ and}$$

$$-\beta 0.95 \quad (7b).$$

In each of Embodiments 1 to 5, the first lens sub-unit B1*a* consists of a cemented lens formed by cementing a positive lens and a negative lens. Alternatively, the first lens sub-unit B1*a* consists of a negative lens and a positive lens. The third lens sub-unit B1*c* consists of a cemented lens formed by cementing a negative lens and a positive lens, and a positive lens. The third lens unit B3 consists of a cemented lens formed by cementing a positive lens and a negative lens. Alternatively, the third lens unit B3 consists of one positive lens. Still alternatively, the third lens unit B3 consists of a cemented lens formed by cementing a negative lens and a positive lens. The lens units are configured as described above to obtain the optical system having the high optical performance.

An image pickup apparatus including the optical system according to the present invention is described with reference to FIG. 21. In FIG. 21, there is illustrated an image pickup optical system 10 including an optical system 1 according to any one of Embodiments 1 to 5.

The image pickup optical system 10 is held by a lens barrel 2 serving as a holding member. A camera main body 20 includes a quick return mirror 3, a focusing plate 4, a roof pentaprism 5, an eyepiece 6, an image pickup element 7 configured to receive light of an image, and the like. The quick return mirror 3 reflects a ray from the image pickup optical system 10 upward. The focusing plate is arranged at an image forming position of the image pickup optical system 10. The roof pentaprism 5 converts a reverse image formed on the focusing plate 4 into an erect image. An observer observes the erect image through the eyepiece 6.

The exemplary embodiments of the present invention are described above, but the present invention is not limited to those embodiments and can be modified and changed variously within the scope of the gist thereof. For example, in each of Embodiments 1 to 5, the optical system consists of only refraction optical elements (so-called "lenses"), but may include a diffraction optical element. Moreover, in each of Embodiments 1 to 5, the flare cut stop FS is included in the second lens unit. However, the flare cut stop FS may be included in another lens unit, or no flare cut stop FS may be included. Moreover, the flare cut stop FS may have a constant aperture diameter.

Next, Numerical Data 1 to 5 corresponding to Embodiments 1 to 5 of the optical system of the present invention are described below. In the numerical data, i indicates the order of surfaces from the object side. A curvature radius of the i-th lens surface from the object side is represented by ri, a lens thickness or an air gap between the i-th surface and the (i+1)-th surface is represented by di, and a refractive index and an Abbe number of an optical medium between the i-th surface and the (i+1)-th surface with respect to the d-line are represented by ndi and vdi, respectively. A variable interval is a value obtained when an object distance is changed. A lateral magnification is represented by β, and a back focus is represented by BF. In the numerical data, the surface number r4 is a dummy surface used for design. The asterisk (*) suffixed to the surface number indicates that the surface is an aspherical surface.

Further, when a direction of travel of light is defined as positive, a shift amount from a surface vertex in an optical axis direction is represented by x, a height from the optical axis in the direction perpendicular to the optical axis is represented by h, a paraxial radius of curvature is represented by r, a conic constant is represented by K, and aspherical coefficients are represented by A4, A6, A8, and A10, an aspherical shape is expressed by the following equation:

$$x=(h^2/r)/[1+\{1-(1+K)\times(h/r)^2\}^{1/2}]+A4\times h^4+A6\times h^6+A8\times h^8+A10\times h^{10}.$$

The numerical value "E±XX" means "×10±XX". Moreover, relationships between the above-mentioned conditional expressions and Numerical Embodiments are shown in (Table 1) and (Table 2).

[Numerical Data 1]

| Unit mm | | | | |
|---|---|---|---|---|
| Surface data | | | | |
| Surface number i | ri | di | ndi | vdi |
| 1 | 34.165 | 2.48 | 1.85478 | 24.8 |
| 2 | 3300.513 | 1.00 | 1.48749 | 70.2 |
| 3 | 10.582 | 5.90 | | |
| 4 | ∞ | 2.59 | | |
| 5 | −125.841 | 2.25 | 1.80400 | 46.6 |
| 6 | −37.952 | 4.58 | | |
| 7 | −15.269 | 0.90 | 1.85478 | 24.8 |
| 8 | 59.190 | 4.63 | 1.78590 | 44.2 |
| 9 | −19.645 | 0.18 | | |
| 10* | 40.662 | 5.98 | 1.58313 | 59.4 |
| 11* | −17.849 | 0.50 | | |
| 12 (Stop) | ∞ | (Variable) | | |
| 13 | −98.208 | 2.15 | 1.95906 | 17.5 |
| 14 | −23.966 | 0.50 | 1.80610 | 33.3 |
| 15 | 21.148 | 5.43 | | |
| 16 | ∞ | (Variable) | (Flare cut stop) | |
| 17 | 99.857 | 7.67 | 1.62299 | 58.2 |
| 18 | −19.603 | 1.10 | 1.67270 | 32.1 |
| 19 | −33.023 | 35.46 | | |
| Image plane | ∞ | | | |

Aspherical surface data

Tenth surface

K = 0.00000e+000  A4 = −9.11209e−006  A6 = −7.29675e−008
A8 = 6.77260e−010

Eleventh surface

K = 0.00000e+000  A4 = 2.71641e−005  A6 = −5.37377e−008
A8 = 7.10081e−010

Various data

| Focal length | 36.1 |
|---|---|
| F-number | 2.92 |
| Half angle of view (degree) | 20.73 |
| Image height | 13.66 |
| Total lens length | 98.76 |
| BF | 35.46 |

| Unit mm | | |
|---|---|---|
| | When focus is at infinity | When focus is at close distance |
| β | 0.00 | −1.00 |
| d12 | 3.08 | 14.68 |
| d16 | 12.37 | 0.77 |

[Numerical Data 2]

| Unit mm | | | | |
|---|---|---|---|---|
| Surface data | | | | |
| Surface number i | ri | di | ndi | vdi |
| 1 | 22.682 | 2.75 | 1.85478 | 24.8 |
| 2 | 117.687 | 0.80 | 1.49700 | 81.5 |
| 3 | 8.410 | 6.29 | | |
| 4 | −72.828 | 1.85 | 1.77250 | 49.6 |
| 5 | −29.290 | 4.13 | | |
| 6 | −13.251 | 0.80 | 1.78472 | 25.7 |
| 7 | 202.287 | 4.04 | 1.59522 | 67.7 |
| 8 | −14.603 | 0.15 | | |
| 9* | 43.892 | 4.62 | 1.58313 | 59.4 |
| 10* | −15.067 | 0.50 | | |
| 11 (Stop) | ∞ | (Variable) | | |
| 12 | −558.242 | 1.31 | 1.95906 | 17.5 |
| 13 | −47.028 | 0.55 | 1.80100 | 35.0 |
| 14 | 19.493 | 10.16 | | |
| 15 | ∞ | (Variable) | (Flare cut stop) | |
| 16 | 674.652 | 4.90 | 1.62299 | 58.2 |
| 17 | −32.728 | 34.46 | | |
| Image plane | ∞ | | | |

Aspherical surface data

Ninth surface

K = 0.00000e+000  A4 = −2.74861e−005  A6 = −8.78159e−008

Tenth surface

K = 0.00000e+000  A4 = 2.05951e−005  A6 = −8.41224e−008
A8 = 6.16965e−010  A10 = −3.37403e−012

Various data

| Focal length | 39.00 |
|---|---|
| F-number | 3.60 |
| Half angle of view (degree) | 19.30 |
| Image height | 13.66 |
| Total lens length | 94.52 |
| BF | 34.46 |

| | When focus is at infinity | When focus is at close distance |
|---|---|---|
| β | 0.00 | −1.00 |
| d11 | 2.03 | 12.29 |
| d15 | 15.17 | 4.91 |

[Numerical Data 3]

| Unit mm | | | | |
|---|---|---|---|---|
| Surface data | | | | |
| Surface number i | ri | di | ndi | vdi |
| 1 | 26.250 | 2.60 | 1.85478 | 24.8 |
| 2 | 50.631 | 0.20 | | |

-continued

Unit mm

| | | | | |
|---|---|---|---|---|
| 3 | 43.293 | 0.80 | 1.53775 | 74.7 |
| 4 | 11.424 | 8.10 | | |
| 5 | −186.996 | 2.34 | 1.77250 | 49.6 |
| 6 | −38.655 | 5.77 | | |
| 7 | −14.980 | 0.80 | 1.78472 | 25.7 |
| 8 | 554.539 | 4.68 | 1.69680 | 55.5 |
| 9 | −19.196 | 0.15 | | |
| 10* | 55.068 | 5.00 | 1.58313 | 59.4 |
| 11* | −18.319 | 0.50 | | |
| 12 (Stop) | ∞ | (Variable) | | |
| 13 | −161.193 | 1.63 | 1.95906 | 17.5 |
| 14 | −49.264 | 0.60 | 1.61340 | 44.3 |
| 15 | 19.274 | 12.00 | | |
| 16 | ∞ | (Variable) | (Flare cut stop) | |
| 17 | −123.248 | 5.08 | 1.62299 | 58.2 |
| 18 | −23.813 | 1.30 | 1.85478 | 24.8 |
| 19 | −29.552 | 38.53 | | |
| Image plane | ∞ | | | |

Aspherical surface data

Tenth surface

K = 0.00000e+000   A4 = −9.97720e−006   A6 = 4.05621e−009
Eleventh surface

K = 0.00000e+000   A4 = 1.86618e−005   A6 = 1.60228e−008
A8 = 3.81452e−011   A10 = 1.61469e−013

Various data

| | |
|---|---|
| Focal length | 48.00 |
| F-number | 3.60 |
| Half angle of view (degree) | 15.89 |
| Image height | 13.66 |
| Total lens length | 109.40 |
| BF | 38.53 |

| | When focus is at infinity | When focus is at close distance |
|---|---|---|
| β | 0.00 | −1.00 |
| d12 | 1.84 | 14.32 |
| d16 | 17.48 | 5.00 |

[Numerical Data 4]

Unit mm

Surface data

| Surface number i | ri | di | ndi | vdi |
|---|---|---|---|---|
| 1 | 25.024 | 3.34 | 1.85478 | 24.8 |
| 2 | 215.666 | 0.90 | 1.53775 | 74.7 |
| 3 | 9.448 | 8.38 | | |
| 4 | −93.499 | 1.81 | 1.77250 | 49.6 |
| 5 | −32.555 | 4.15 | | |
| 6 | −16.325 | 0.81 | 1.85478 | 24.8 |
| 7 | 44.167 | 4.59 | 1.62299 | 58.2 |
| 8 | −21.723 | 0.15 | | |
| 9* | 65.204 | 4.76 | 1.76802 | 49.2 |
| 10* | −17.392 | 0.50 | | |
| 11 (Stop) | ∞ | (Variable) | | |
| 12 | −171.676 | 1.37 | 1.95906 | 17.5 |
| 13 | −45.565 | 0.50 | 1.74950 | 35.3 |
| 14 | 21.599 | 5.87 | | |
| 15 | ∞ | (Variable) | (Flare cut stop) | |
| 16 | 68.834 | 1.00 | 1.72916 | 54.7 |
| 17 | 30.368 | 7.59 | 1.58913 | 61.1 |
| 18 | −35.497 | 34.20 | | |
| Image plane | ∞ | | | |

Aspherical surface data

Ninth surface

K = 0.00000e+000   A4 = −1.48394e−005   A6 = −2.45021e−008
A8 = −8.09030e−012
Tenth surface K = 0.00000e+000   A4 = 1.43684e−005   A6 = −1.01780e−008

Various data

| | |
|---|---|
| Focal length | 35.14 |
| F-number | 2.91 |
| Half angle of view (degree) | 21.24 |
| Image height | 13.66 |
| Total lens length | 98.51 |
| BF | 34.20 |

| | When focus is at infinity | When focus is at close distance |
|---|---|---|
| β | 0.00 | −1.00 |
| d11 | 2.85 | 16.19 |
| d15 | 15.75 | 2.41 |

[Numerical Data 5]

Unit mm

Surface data

| Surface number i | ri | di | ndi | vdi |
|---|---|---|---|---|
| 1 | −4194.588 | 0.90 | 1.58313 | 59.4 |
| 2* | 12.393 | 3.02 | | |
| 3 | 20.841 | 3.33 | 1.78472 | 25.7 |
| 4 | 66.642 | 6.65 | | |
| 5 | −171.874 | 1.85 | 1.77250 | 49.6 |
| 6 | −43.192 | 6.29 | | |
| 7 | −11.496 | 0.90 | 1.74000 | 28.3 |
| 8 | 24.373 | 5.33 | 1.78800 | 47.4 |
| 9 | −20.469 | 0.15 | | |
| 10* | 26.872 | 4.99 | 1.58313 | 59.4 |
| 11* | −17.651 | 1.00 | | |
| 12 (Stop) | ∞ | (Variable) | | |
| 13 | −213.174 | 1.89 | 1.95906 | 17.5 |
| 14 | −23.915 | 0.50 | 1.91082 | 35.3 |
| 15 | 21.448 | 4.70 | | |
| 16 | ∞ | (Variable) | (Flare cut stop) | |
| 17 | 91.698 | 1.00 | 1.85478 | 24.8 |
| 18 | 35.217 | 6.11 | 1.58913 | 61.1 |
| 19 | −27.016 | 34.99 | | |
| Image plane | ∞ | | | |

Aspherical surface data

Second surface

K = 0.00000e+000   A4 = −4.83953e−005   A6 = −2.97431e−007
A8 = 3.94296e−010   A10 = −1.56387e−011
Tenth surface K = 0.00000e+000   A4 = −1.95347e−005   A6 = −1.31133e−008
A8 = 2.95818e−010

-continued

Unit mm

Eleventh surface

K = 0.00000e+000    A4 = 5.11340e−005    A6 = −3.74721e−008
A8 = 5.01974e−010

Various data

| Focal length | 29.50 |
|---|---|
| F-number | 2.90 |
| Half angle of view (degree) | 24.85 |
| Image height | 13.66 |
| Total lens length | 94.63 |
| BF | 34.99 |

|  | When focus is at infinity | When focus is at close distance |
|---|---|---|
| β | 0.00 | −1.00 |
| d12 | 1.40 | 9.66 |
| d16 | 9.63 | 1.37 |

TABLE 1

|  | Embodiment | | | | |
|---|---|---|---|---|---|
|  | 1 | 2 | 3 | 4 | 5 |
| DL | 98.759 | 94.520 | 109.400 | 98.512 | 94.630 |
| DB | 86.785 | 84.672 | 98.307 | 85.895 | 80.732 |
| f | 36.100 | 39.000 | 48.000 | 36.137 | 29.498 |
| f1 | 20.029 | 19.270 | 22.972 | 20.818 | 15.402 |
| f2 | −23.880 | −25.335 | −32.395 | −27.921 | −22.147 |
| f3 | 42.560 | 50.237 | 67.832 | 45.395 | 42.806 |
| f1C | 22.549 | 20.463 | 25.468 | 22.727 | 19.887 |
| β2 | 13.360 | 6.502 | 4.465 | 7.970 | 11.233 |
| β3 | 0.135 | 0.311 | 0.449 | 0.212 | 0.170 |
| Nd_LIS | 1.804 | 1.773 | 1.773 | 1.773 | 1.773 |
| β | −1.000 | −1.000 | −1.000 | −1.000 | −1.000 |

TABLE 2

|  |  | Embodiment | | | | |
|---|---|---|---|---|---|---|
| Conditional Expression | | 1 | 2 | 3 | 4 | 5 |
| (1) | DB/DL | 0.879 | 0.896 | 0.899 | 0.872 | 0.853 |
| (2) | f3/f | 1.179 | 1.288 | 1.413 | 1.256 | 1.451 |
| (3) | f1C/f | 0.625 | 0.525 | 0.531 | 0.629 | 0.674 |
| (4) | \|f2\|/f | 0.662 | 0.650 | 0.675 | 0.773 | 0.751 |
| (5) | \|(1 − β2$^2$) × (β3$^2$)\| | 3.230 | 3.999 | 3.822 | 2.804 | 3.618 |
| (6) | Nd_LIS | 1.804 | 1.773 | 1.773 | 1.773 | 1.773 |
| (7) | −β | 1.000 | 1.000 | 1.000 | 1.000 | 1.000 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-100252, filed May 19, 2016, which is hereby incorporated by reference herein in its entirety.

What is claimed is:

1. An optical system, comprising, in order from an object side to an image side:
a first lens unit having a positive refractive power;
a second lens unit having a negative refractive power; and
a third lens unit having a positive refractive power,
wherein, during focusing from infinity to a close distance, the second lens unit moves toward the image side, and an interval between each pair of adjacent lens units is changed,
wherein the first lens unit consists of, in order from the object side to the image side:
a first lens sub-unit having a negative refractive power which does not move for image stabilization;
a second lens sub-unit having a positive refractive power, which moves during the image stabilization; and
a third lens sub-unit which does not move for the image stabilization,
wherein the second lens sub-unit includes a meniscus positive lens LIS having a concave surface facing the object side, and
wherein the following conditional expression is satisfied:

$0.78 < DB/DL < 0.95$, where DL represents a distance from a lens surface closest to the object side in the first lens unit to an image plane when focusing at infinity, and DB represents a distance from a lens surface closest to the object side in the second lens sub-unit to the image plane when focusing at infinity.

2. An optical system according to claim 1, wherein the following conditional expression is satisfied:

$0.2 < f3/f < 5.0$, where f represents a focal length of the optical system, and f3 represents a focal length of the third lens unit.

3. An optical system according to claim 1, wherein the third lens sub-unit has a positive refractive power.

4. An optical system according to claim 1, wherein the following conditional expression is satisfied:

$0.1 < f1C/f < 3.0$, where f represents a focal length of the optical system, and f1C represents a focal length of the third lens sub-unit.

5. An optical system according to claim 1, wherein the following conditional expression is satisfied:

$0.1 < |f2|/f < 3.0$, where f represents a focal length of the optical system, and f2 represents a focal length of the second lens unit.

6. An optical system according to claim 1, wherein the following conditional expression is satisfied:

$|(1−β2^2) × (β3^2)| > 2.0$, where β2 represents a lateral magnification of the second lens unit when focusing at infinity, and β3 represents a lateral magnification of the third lens unit when focusing at infinity.

7. An optical system according to claim 1, wherein the second lens sub-unit consists of the meniscus positive lens LIS having a concave surface facing the object side.

8. An optical system according to claim 1, wherein the following conditional expression is satisfied:

$Nd\_LIS > 1.70$, where Nd_LIS represents a refractive index of a material of the meniscus positive lens LIS.

9. An optical system according to claim 1, wherein the following conditional expression is satisfied:

$−β > 0.49$, where β represents a lateral magnification of the optical system when focusing at a minimum object distance.

10. An optical system according to claim 1, wherein the first lens unit does not move for focusing.

11. An optical system according to claim 1, wherein the third lens unit does not move for focusing.

12. An optical system according to claim 1, wherein the second lens unit consists of a cemented lens formed by cementing a positive lens and a negative lens.

13. An optical system according to claim 1, further comprising an aperture stop, which is arranged between the first lens unit and the second lens unit.

14. An optical system according to claim 1, further comprising a flare cut stop having one of constant and variable aperture diameter, which is arranged between the second lens unit and the third lens unit.

15. An image pickup apparatus, comprising:
an optical system; and
an image pickup element configured to receive an image formed by the optical system,
the optical system comprising, in order from an object side to an image side:
a first lens unit having a positive refractive power;
a second lens unit having a negative refractive power; and
a third lens unit having a positive refractive power,
wherein, during focusing from infinity to a close distance, the second lens unit moves toward the image side, and an interval between each pair of adjacent lens units is changed,
wherein the first lens unit consists of, in order from the object side to the image side:
a first lens sub-unit having a negative refractive power, which does not move for image stabilization;
a second lens sub-unit having a positive refractive power, which moves during the image stabilization; and
a third lens sub-unit, which does not move for the image stabilization,
wherein the second lens sub-unit includes a meniscus positive lens LIS having a concave surface facing the object side, and
wherein the following conditional expression is satisfied:

$$0.78 < DB/DL < 0.95,$$

where DL represents a distance from a lens surface closest to the object side in the first lens unit to an image plane when focusing at infinity, and DB represents a distance from a lens surface closest to the object side in the second lens sub-unit to the image plane when focusing at infinity.

* * * * *